United States Patent
Watanabe et al.

(10) Patent No.: US 7,199,901 B2
(45) Date of Patent: Apr. 3, 2007

(54) IMAGE MODIFICATION APPARATUS AND METHOD

(75) Inventors: Mikio Watanabe, Asaka (JP); Norihisa Haneda, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 181 days.

(21) Appl. No.: 09/946,542

(22) Filed: Sep. 6, 2001

(65) Prior Publication Data

US 2002/0030834 A1 Mar. 14, 2002

Related U.S. Application Data

(62) Division of application No. 09/084,960, filed on May 27, 1998, now Pat. No. 6,344,907.

(30) Foreign Application Priority Data

May 30, 1997 (JP) ............................. 9-158101
Oct. 13, 1997 (JP) ............................. 9-293217

(51) Int. Cl.
 G06K 15/02 (2006.01)
 H04N 1/40 (2006.01)
(52) U.S. Cl. .................. 358/1.9; 358/448; 358/452; 358/453; 358/909.1
(58) Field of Classification Search ............. 358/448, 358/452, 453, 527, 538, 909.1, 1.9, 537, 358/540; 382/258, 311
See application file for complete search history.

(56) References Cited

U.S. PATENT DOCUMENTS

| 4,656,524 | A |   | 4/1987  | Norris et al.      |
| 4,958,221 | A |   | 9/1990  | Tsuboi et al.      |
| 5,075,787 | A | * | 12/1991 | Shaughnessy et al. ...... 358/453 |
| 5,563,720 | A |   | 10/1996 | Edgar et al.       |
| 5,583,655 | A | * | 12/1996 | Tsukamoto et al. ......... 358/452 |
| 5,596,346 | A | * | 1/1997  | Leone et al. ................ 345/667 |
| 5,678,103 | A |   | 10/1997 | Tominaga           |
| 5,724,579 | A | * | 3/1998  | Suzuki .................... 707/104.1 |

FOREIGN PATENT DOCUMENTS

| JP | 62-217372 A | 9/1987  |
| JP | 1-177680 A  | 7/1989  |
| JP | 2-226962 A  | 9/1990  |
| JP | 4-367077 A  | 12/1992 |
| JP | 7-105395 A  | 4/1995  |
| JP | 7-135605 A  | 5/1995  |
| JP | 7-296178 A  | 11/1995 |
| JP | 8-131252 A  | 5/1996  |

* cited by examiner

*Primary Examiner*—Thomas D. Lee
(74) *Attorney, Agent, or Firm*—Birch, Stewart, Kolasch & Birch, LLP

(57) ABSTRACT

An individual not accustomed to operating a computer can obtain, with comparative ease, a modified image that is the result of modifying an image obtained by an image sensing operation. A subject is photographed by a video camera, and an image representing the subject is displayed in a main display area of a display unit. A modification target area is set in the main display area in advance, and icons representing methods of modification are displayed in an auxiliary display area. When one of these icons is selected, the image within the modification target area is modified by the selected modification method. If necessary, the user may move so that the portion of the subject image that the user wishes to be modified will fall within the modification target area.

19 Claims, 22 Drawing Sheets

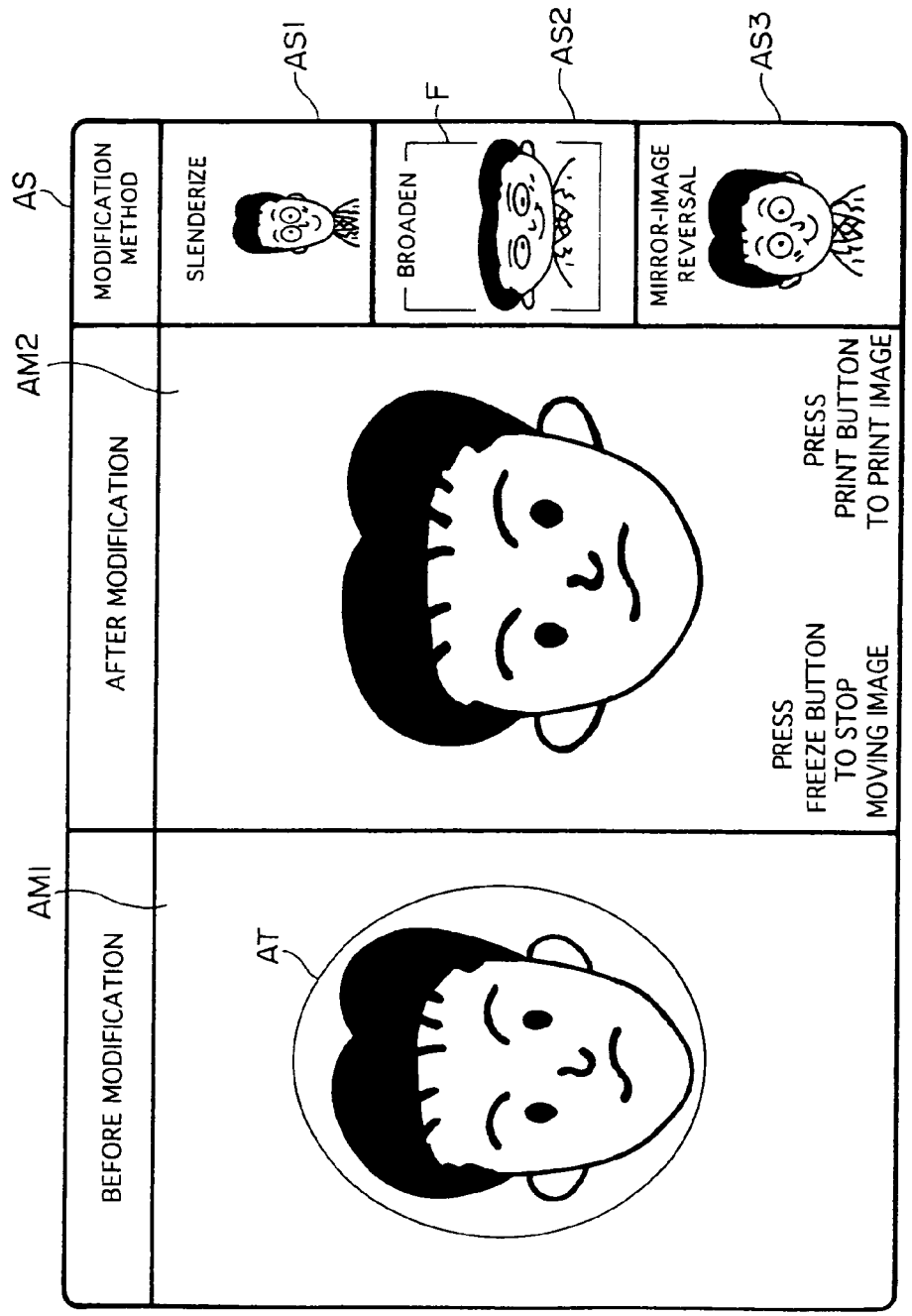

Fig. 18

IMAGE MODIFICATION
PROCESSING FILE

IMAGE MODIFICATION
PROCESSING HEADER

IMAGE MODIFICATION
METHOD DATA

MODIFICATION TARGET
AREA DATA

IMAGE MODIFICATION APPARATUS AND METHOD

This application is a divisional of application Ser. No. 09/084,960, filed on May 27, 1998, now U.S. Pat No. 6,344,907 the entire contents of which are hereby incorporated by reference and for which priority is claimed under 35 U.S.C. § 120; and this application claims priority of application Ser. No. 9-158101 and 9-293217 filed in Japan on May 30, 1997 and Oct. 13, 1997, respectively under 35 U.S.C. § 119.

BACKGROUND OF THE INVENTION

1. Field of the Invention

This invention relates to an apparatus and method for sensing the image of a subject, modifying the image of the subject obtained by such image sensing and displaying the modified image, as well as to a digital still-video camera, an image data recording method and an image modification method.

2. Description of the Related Art

Owing to advances in computer hardware and software, it has become possible to digitize displayed images such as photographs and input the digital images to a computer. It is also possible to apply modification processing such as enlargement, reduction and rotation to all or part of an image thus input to the computer.

When all or part of a digital image is to be modified, the digital image is displayed on the display screen of the computer monitor and a keyboard and mouse are used to specify the limits of the image that is to be modified.

However, to someone not accustomed to operating a computer, it is still difficult to input the image to the computer and to specify the limits of the image to be modified.

SUMMARY OF THE INVENTION

Accordingly, an object of the present invention is to arrange it so that even someone not accustomed to operating a computer can obtain, with comparative ease, a modified image that is the result of modifying an image obtained by an image sensing operation.

According to a first aspect of the present invention, the foregoing object is attained by providing an image modification apparatus comprising image sensing means (an image sensing device) for sensing the image of a subject and outputting an image signal representing the image of the subject; a first display unit for displaying, on a display screen, the image of the subject represented by the image signal output by the image sensing means; data storage means (a data storage device) for storing modification target area data for deciding a modification target area; image modification means (an image modification device) for processing the image signal, which is output by the image sensing means, so as to modify an image displayed within the modification target area decided by the modification target area data that has been stored in the data storage means; and image display control means (an image display controller) for controlling the first display unit in such a manner that the image of the subject that includes the image modified by the image modification means is displayed on the display screen of the first display unit.

The first aspect of the present invention further provides a method suitable for implementing the image modification apparatus described above. Specifically, the method comprises the steps of sensing the image of a subject and obtaining an image signal representing the image of the subject; displaying, on a display screen of a first display unit, the image of the subject represented by the image signal obtained by the image sensing; storing modification target area data representing a modification target area; processing the image signal, which has been obtained by image sensing, so as to modify an image displayed within the modification target area decided by the modification target area data that has been stored; and displaying the image of the subject that includes the image modified by the image modification processing on the display screen of the first display unit.

The image modification apparatus may be a stationary apparatus of large size or a portable apparatus of small size, such as a digital still camera.

In accordance with the first aspect of the present invention, the image of a subject is sensed and the subject image obtained by such sensing is displayed on the first display unit.

Modification target area data representing an area that is to be modified is stored in memory. An image signal representing the image of the subject is processed in such a manner that the image within the modification target area represented by the modification target data will be modified. The image of the subject inclusive of the modified image in the modification target area is displayed on the first display unit.

All or part of the image of the subject can be modified and displayed merely by moving the subject in conformity with the modification target area (if the user himself or herself is the subject, then the user moves); the user need not specify the limits of the image to be modified. In a case where the image modification apparatus can itself be moved with ease, as when the apparatus is a digital still camera, then all or a part of the image of the subject can be modified and displayed merely by moving the image modification apparatus in such a manner that the portion of the subject to be modified falls within the modification target area. Thus, even a person not accustomed to using a computer can simply obtain a modified image that is different from the image captured.

It is preferred that the modification target area be displayed in a form superimposed on the image of the subject at a predetermined position on the display screen of the first display unit. This clarifies the limits of the modification target area.

It is preferred that the modified image be printable.

It is permissible to adopt an arrangement in which it is possible to execute modification processing of a plurality of types. In such case it would be so arranged that one of the plurality of types of modification processing is designated, the designated modification processing is executed and the resulting image displayed.

In a case where it is possible to execute modification processing of a plurality of types, thumbnail images resulting from the plural types of modification processing may be displayed on a second display unit. While observing the thumbnail images resulting from the plural types of modification processing displayed on the second display unit, the user designates a desired processed thumbnail image, the image being displayed in the modification target area is subjected to modification processing identical with the modification processing that was applied to the designated thumbnail image, and the image of the subject inclusive of the modified image is displayed on the first display unit.

Since thumbnail images after modification processing are displayed on the second display unit, the user can designate the desired modification processing after ascertaining the condition of an image that has undergone modification processing. An arrangement may be adopted in which the first and second display units are realized by a single display unit, with the image of the subject inclusive of the part modified and a thumbnail image resulting from modification processing being displayed in different areas on the display screen of one and the same display unit.

The image of a subject before modification processing may be displayed on a third display unit.

Since the image of a subject after modification processing is displayed on the first display unit and the image of the subject before modification processing is displayed on the third display unit, the images of the subject before and after modification processing can be directly compared. It goes without saying that the first and third display units may be realized by a single display unit, with the images of the subject before and after modification processing being displayed in different areas on the display screen of one and the same display unit.

In a case where there are a plurality of the modification target areas, a modification target area may be designated and the image residing in the designated modification target area may be modified. It is possible to modify only a desired portion of the image of a subject. It goes without saying that the portions of the image of the subject residing in all of the modification target areas may be modified without a modification target area being designated.

The process through which an image is modified may be displayed. In such case modification processing can be stopped by applying a modification stop command during the course of image modification, and the modified image that prevailed when the modification stop command was applied can be displayed on the first display unit. This makes it possible to obtain an image having a desired state of modification.

It is permissible to provide a fourth display unit which displays a plurality of thumbnail images from among modified images that are in the process of undergoing modification. A plurality of images in the modification process can be verified, and an image being displayed in the modification target area can be subjected to processing identical with the modification processing that was applied to a desired thumbnail image among a plurality of thumbnail images being displayed on the fourth display unit. It goes without saying that the first and fourth display units may be realized by a single display unit, with the image of the subject inclusive of the modified part thereof and a plurality of thumbnail images indicative of the process of modification being displayed in different areas on the display screen of one and the same display unit.

According to a second aspect of the present invention, the foregoing object is attained by providing a digital still camera comprising a viewfinder in which a modification target area appears; image sensing means (an image sensing device) for sensing the image of a subject observed through the viewfinder and outputting image data representing the image of the subject; data input means (a data input device) for inputting data which specifies the modification target area; and recording control means (a recording controller) for recording, in associated form on a recording medium, the image data output by the image sensing means and the data specifying the modification target area input from the data input means.

The second aspect of the present invention further provides a method suited to the camera described above. The method comprises the steps of sensing the image of a subject observed through a viewfinder and obtaining image data representing the image of the subject; showing a modification target area in the viewfinder in a digital still camera that records the obtained image data on a recording medium; inputting data which specifies the modification target area shown in the viewfinder; and recording the input data specifying the modification target area on the recording medium in association with the image data.

The present invention further provides an apparatus for modifying the image of a subject based upon the image data and the data specifying the modification target area stored on the recording medium by the second aspect of the present invention.

More specifically, this apparatus comprises reading means (a reading device) for reading image data, which represents the image of a subject, and modification target area specifying data, which specifies a modification target area, from a recording medium on which the image data and the modification target area specifying data have been recorded; image modification means (an image modification device) for processing the image data so as to modify that part of the image of the subject, which is represented by the image data that has been read by the reading means, that lies within the modification target area represented by the modification target area specifying data that has been read by the reading means; and a display unit for displaying the image of the subject that includes the image modified by the image modification means.

A method suited to this apparatus also is provided. Specifically, the method comprises the steps of reading image data, which represents the image of a subject, and modification target area specifying data, which specifies a modification target area, from a recording medium on which the image data and the modification target area specifying data have been recorded in associated form; and processing the image data so as to modify that part of the image of the subject, which is represented by the image data, that lies within the modification target area represented by the modification target area specifying data.

The user enters modification target area specifying data which specifies a modification target area. While observing the modification target area appearing in the viewfinder, the user moves the camera or has the subject move in such a manner that the portion of the subject desired to be modified will fall within the modification target area.

The subject is photographed with the portion that is desired to be modified residing within the modification target area. The image data specifying the subject is recorded on a recording medium, together with the modification target area specifying data that has been entered by the user, in association with the modification target area specifying data. The modification target area specifying data may be data representing the modification target area per se or data specifying the data representing the modification target area.

The image data representing the image of the subject and the modification target area specifying data representing the modification target area are recording on the recording medium in associated form. The image data and modification target area specifying data are read from the recording medium on which they have been recorded, and that part of the subject image, which is represented by the image data, that resides in the modification target area represented by the modification target area specifying data is modified.

It is possible to modify the image of a subject merely by entering the modification target area specifying data, placing the part of the subject that is desired to be modified in the modification target area and performing photography. As a result, even an individual not accustomed to operating a computer is capable of obtaining, with comparative ease, a modified image that is different from the image captured by photography.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a diagram illustrating an example of a display screen according to the third embodiment of the present invention;

FIG. 18 illustrates an image modification processing file according to the fifth embodiment of the present invention;

DESCRIPTION OF THE PREFERRED EMBODIMENTS

Figure 1:
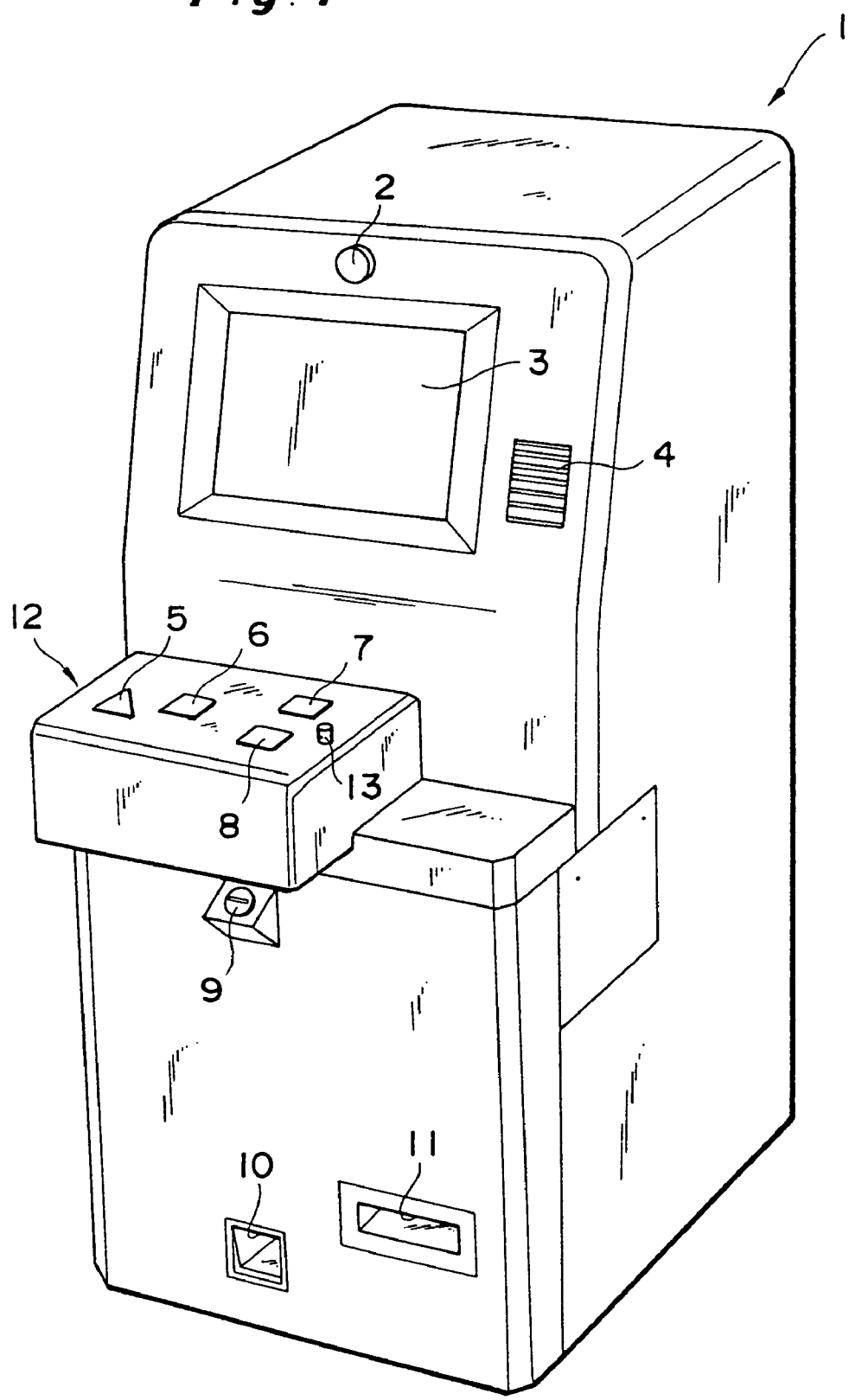
FIG. 1 is a perspective view of an image modification apparatus according to the present invention.

FIG. 1 is a perspective view of an image modification apparatus 1 according to an embodiment of the present invention.

The image modification apparatus 1 photographs the user (subject), modifies part of the image obtained by photography, displays the image and prints the image.

The image modification apparatus 1 has a front side the upper part of which is provided with a video camera 2 approximately at the center thereof. The user stands in front of the image modification apparatus 1 and faces the video camera 2, which captures the image of the user.

A monitor display unit 3 is provided below the video camera 2. The image of the subject captured by the video camera 2 is displayed as a moving picture on the display screen of the monitor display unit 3. (By pressing a freeze button 7, which is described below, a still picture of the subject image that was appearing on the screen when the button was pressed is displayed.)

A speaker 4 for outputting operation guidance by voice is provided on the right side of the monitor display unit 3. The user operates the image modification apparatus 1 in accordance with the voice output by the speaker 4.

The approximate center of the front side of the image modification apparatus 1 is formed to have an operation console 12 protruding from the front side. The operation console 12 is provided with an icon selection button 5 that the user presses when selecting an icon displayed on the monitor display unit 3, as will be described later, a decide/print button 6 that the user presses when deciding an icon and when printing the image of the subject being displayed on the monitor display unit 3, the freeze button 7 pressed when a still picture is to be displayed on the monitor display unit 3, and a cancel button 8. The operation console 12 is further provided with a coin return button 13.

A coin insertion slot 9 for inserting coins when the user utilizes the image modification apparatus 1 is provided below the operation console 12.

The lower part of the front side of the image modification apparatus 1 is provided with a coin return opening 10. By pressing the coin return button 13 before the decide/print button 6 is pressed in order to print the image of the subject, coins that have been inserted into the coin insertion slot 9 are returned.

A print dispenser 11 for dispensing a print obtained by photography is provided on the right side of the coin return opening 10.

Figure 2:
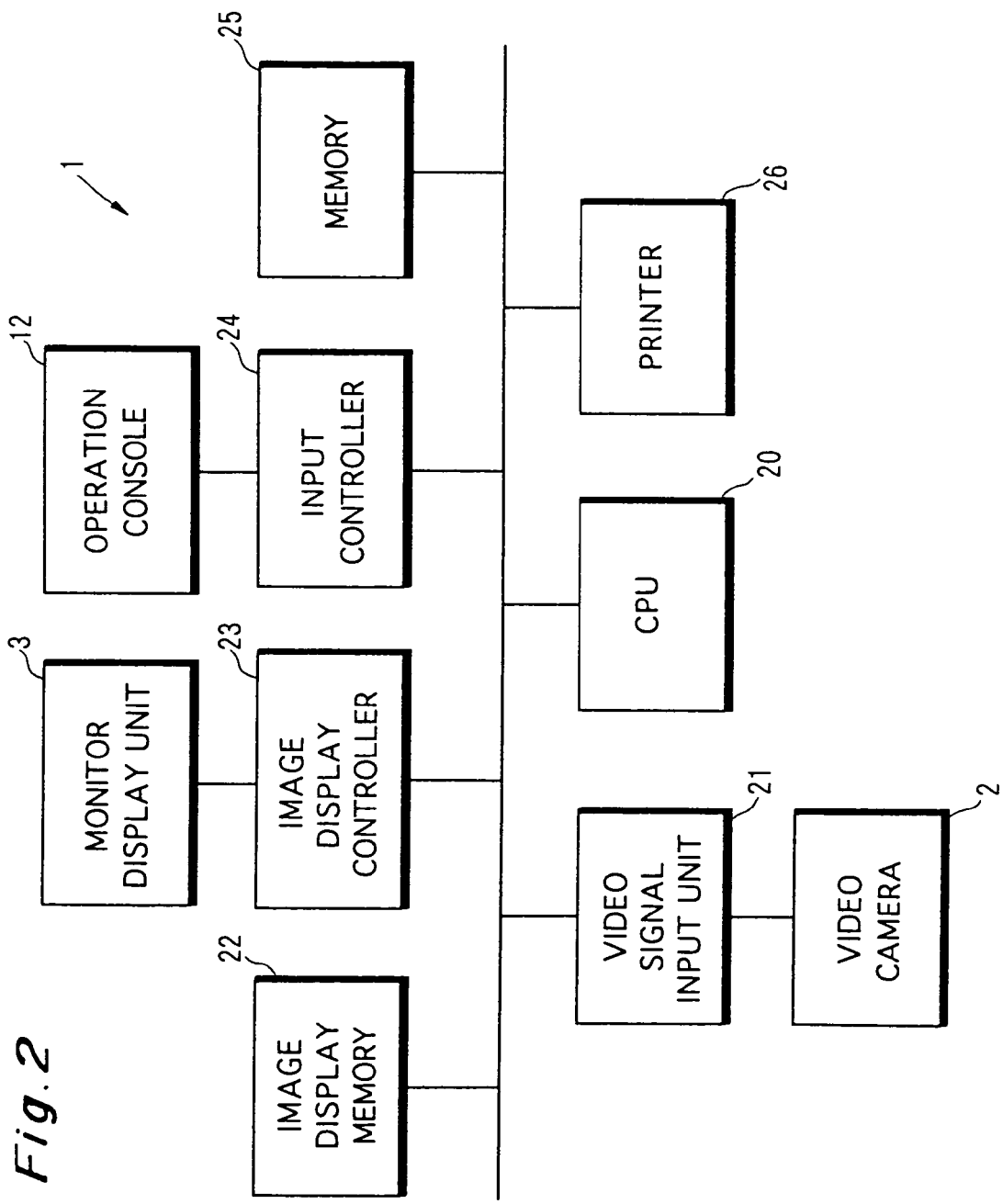
FIG. 2 is a block diagram illustrating the electrical construction of the image modification apparatus.

FIG. 2 is a block diagram showing part of the electrical construction of the image modification apparatus 1. The speaker 4 is not shown in FIG. 2.

The overall operation of the image modification apparatus 1 is under the control of a CPU 20. The image modification apparatus 1 includes a memory 25 for storing an operation program, data representing a modification target area, described later, data representing icons and other necessary data.

When coins are inserted into the coin insertion slot 9 (see FIG. 1), the user is photographed by the video camera 2. A video signal representing the user is applied to a video signal input unit 21 from the video camera 2 and is converted to digital image data.

The digital image data is applied to the CPU 20, which subjects the data to image modification processing if necessary.

The digital image data is read out of the CPU 20 and stored temporarily in an image display memory 22. The digital image data is read out of the image display memory 22 and applied to an image display controller 23. The image represented by the digital image data is displayed as a moving picture on the display screen of the monitor display unit 3 under the control of the image display controller 23.

A signal representing depression of a button on the operation console 12 is applied to the CPU 20 via an input controller 24. The CPU 20 executes processing (image modification processing, image freeze processing, and image reduction processing, and the like) based upon the signal input thereto. When the print button 6 on the operation console 12 is pressed, processing to print the image of the subject being displayed on the monitor display unit 3 is executed by a printer 26.

Figure 3:
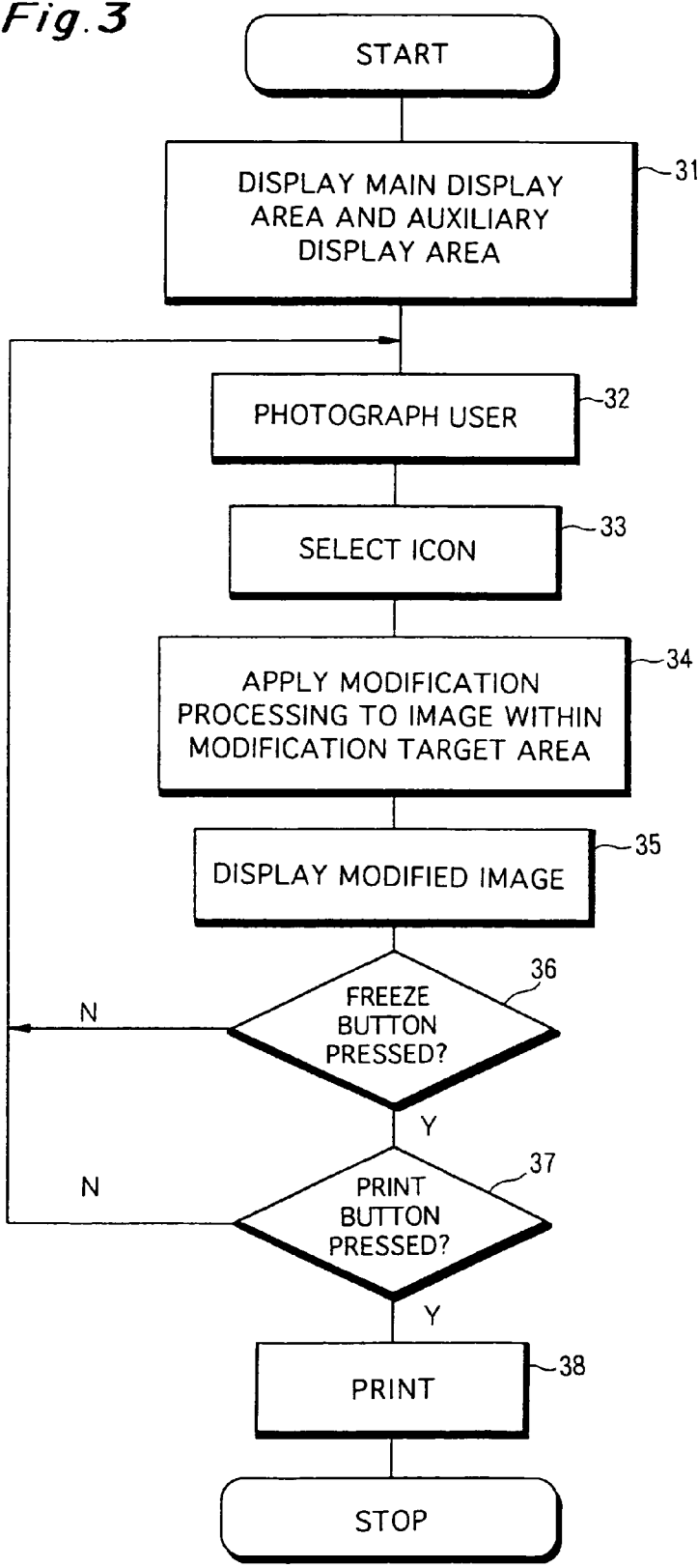
FIG. 3 is a flowchart illustrating an image modification processing procedure according to the present invention.
Figure 4:
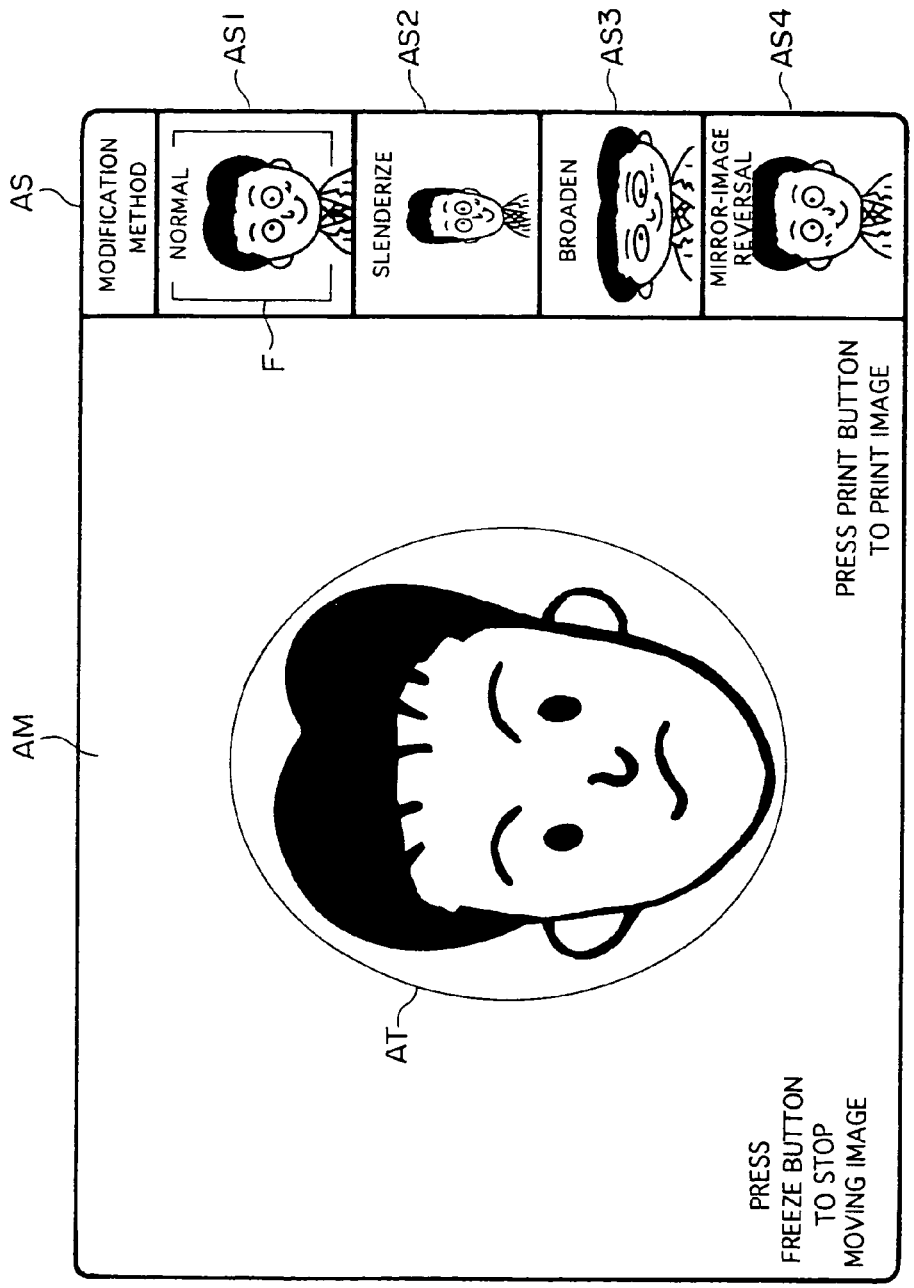
FIG. 4 is a diagram illustrating an example of a display screen according to the present invention.

FIG. 3 is a flowchart illustrating the procedure of processing executed by the image modification apparatus 1, and FIG. 4 illustrates an example of a display screen presented on the monitor display unit 3.

The processing shown in FIG. 3 starts in response to insertion of coins in the coin insertion slot 9 of the image modification apparatus 1, as described above.

When the coins are inserted, image data representing a modification target area and data representing icons is read out of the memory 25 and applied to the image display controller 23. The image display controller 23 causes a main display area AM to be displayed over substantially the entire surface of the display screen of display unit 3, and causes an auxiliary display area AS to be displayed along the right edge of the display screen of the display unit 3 (step 31).

The main display area AM displays an image captured by the video camera 2 and an image after modification. A modification target area AT, which is for indicating a portion of the subject image to be modified, is displayed in the main display area AM. The image that resides within the modification target area AT is modified by processing designated by the user, as will be described later. The position of the modification target area AT is fixed, and the portion of the image desired to be modified is moved by the user so as to fall within modification target area AT.

When it is desired to freeze an image in the main display area AM, directions to the effect that the freeze button 7 should be pressed are displayed in the main display area AM. If the frozen image is to be printed, then directions to the effect that the decide/print button 6 should be pressed are displayed in the main display area AM. It is of course permissible to display other directions as necessary and to express all directions by a voice output from the speaker 4.

Icons indicating methods of modifying the image residing in the modification target area AT are displayed in the auxiliary display area AS. The modification methods available including enlarging, reducing, slenderizing and broadening the image residing in the modification target area AT.

In the example shown in FIG. 4, four auxiliary display areas AS1, AS2, AS3 and AS4 are displayed in the auxiliary display area AS. An icon of a normal face is displayed in the first auxiliary display area AS1. The icon displayed in the first auxiliary display area AS1 is selected if the image is not to be modified. An icon of a slender face is displayed in the second auxiliary display area AS2. The icon displayed in the second auxiliary display area AS2 is selected if the image residing in the modification target area AT is to be made more slender. An icon of a broad face is displayed in the third auxiliary display area AS3. The icon displayed in the third auxiliary display area AS3 is selected if the image residing in the modification target area AT is to be made more broader. An icon of a face that is the mirror image of the normal face is displayed in the fourth auxiliary display area AS4. The icon displayed in the fourth auxiliary display area AS3 is selected if the image residing in the modification target area AT is subjected to a mirror image reversal processing.

Next, the user is photographed by the video camera 2 (step 32). Since the user is standing in front of the video camera 2, this photography operation causes the image of the user to be displayed in the main display area AM. The image within the modification target area AT has not yet been modified.

Next, one of the plurality of icons displayed in the auxiliary display area AS is selected by the user (step 33). A frame F appears in the auxiliary display area AS so as to indicate the icon that has been selected by the icon selection button 5. Whenever the icon selection button 5 is pressed a single time by the user, the frame F is shifted from the first auxiliary display area AS1 to the fourth auxiliary display area AS4 one area at a time. If the icon selection button 5 is pressed by the user when the frame F is located in the first auxiliary display area AS1, the frame F is shifted to the fourth auxiliary display area AS4. If the method of modifying the image has been decided by the user through use of the icon selection button 5, the user presses the decide/print button 6.

If the decide/print button 6 is pressed by the user, the image residing in the modification target area AT is subjected to modification processing by the CPU 20 in accordance with the modification method specified by the icon enclosed by the frame F when the button 6 is pressed, and at a modification ratio that has been decided for each modification method (step 34).

If the decide/print button 6 is pressed when the frame F is located in the first auxiliary display area AS1, the image within the modification target area AT is not subjected to modification processing, as set forth above. If the decide/print button 6 is pressed when the frame F is located in the second auxiliary display area AS2, the image data representing the image of the subject residing in the modification target area AT is sensed based upon the coordinates of predetermined pixels within the modification target area AT, and modification processing is executed in such a manner that the image within the modification target area AT is made more slender, as mentioned above. This processing can be implemented by executing pixel downsampling processing in the horizontal direction. When the image is printed, processing for interpolating pixels in the horizontal direction would be executed in the background of the user in order to make the number of pixels of the overall photographic conform. If the decide/print button 6 is pressed when the frame F is located in the third auxiliary display area AS3, modification processing is executed in such a manner that the image within the modification target area AT is made broader, as mentioned above. This processing can be implemented by executing pixel interpolation processing in the horizontal direction. If the decide/print button 6 is pressed when the frame F is located in the fourth auxiliary display area AS4, modification processing is executed in such a manner that the image within the modification target area AT is subjected to a mirror-image reversal. This processing can be implemented by extracting only the face of the user by edge detection processing and modifying the coordinates of the image representing the extracted face of the user by coordinate modification processing.

The digital image data representing the modified image is stored temporarily in the image display memory 22, the digital image data is read out of the memory 22 and the data is applied to the image display controller 23, whereby a moving picture is displayed on the display screen of the monitor display unit 3 (step 35), as described earlier.

Figure 5:
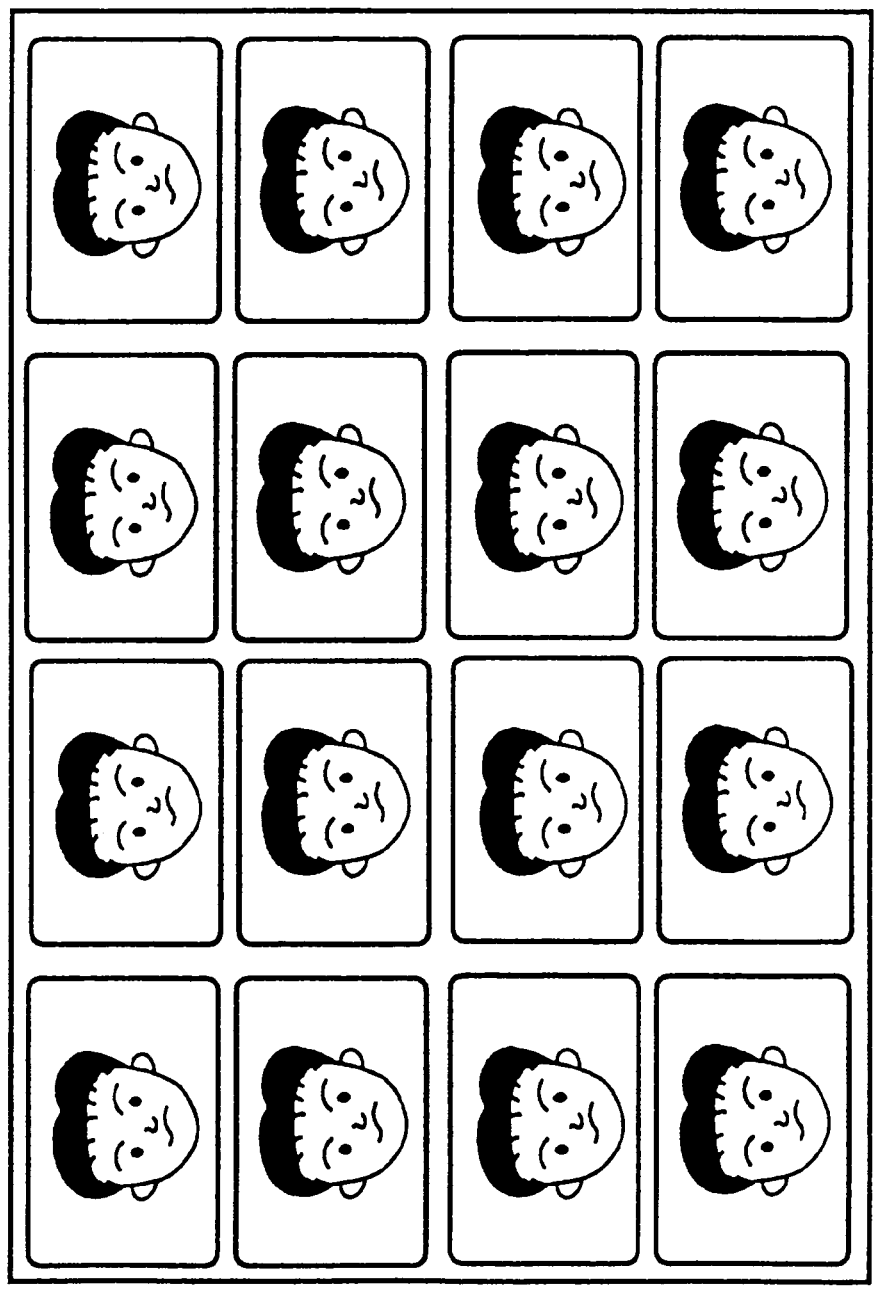
FIG. 5 is a diagram illustrating an example of printing according to the present invention.

The user observes the modified image displayed in the main display area AM and presses the freeze button 7 if the modified image is acceptable (step 36). Pressing the freeze button 7 causes the frozen modified image to be displayed on the display screen of the monitor display unit 3. Next, the user presses the decide/print button 6 (step 37). As a result, the frozen modified image is printed by the printer 26 and the print is dispensed from the print dispenser 11. (step 38). FIG. 5 illustrates an example of the print. In the example depicted in FIG. 5, 16 images of the user that have been subjected to modification processing so as to broaden the user's face are printed on a single sheet. Of course, an arrangement may be adopted in which only one modified image is printed on a single sheet.

If the user is dissatisfied with the modified image displayed in the main display area AM, then the user presses the cancel button 8 ("NO" at step 36 or 37). In this case, an icon is selected again by the icon selection button 5 and the modification processing specified by the selected icon is executed (steps 32 to 37).

Figure 6:
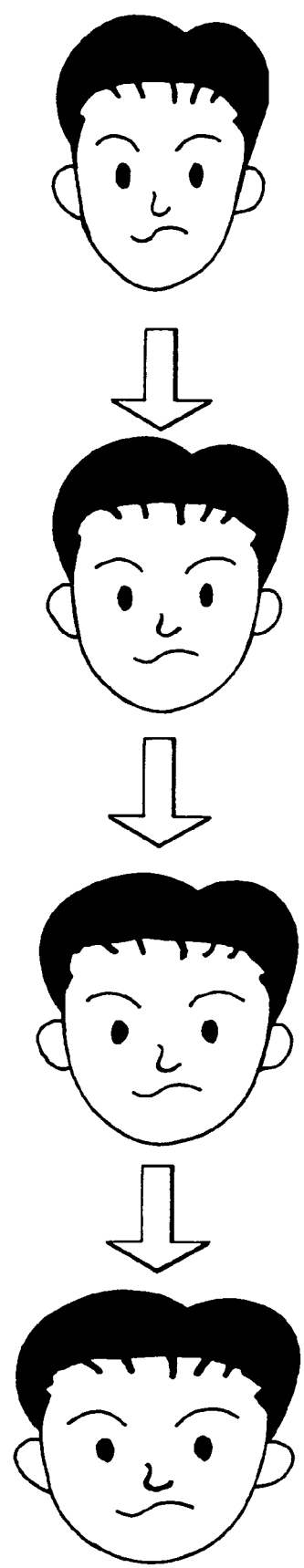
FIG. 6 illustrates the process through which an image displayed on the display screen is modified according to the present invention.

FIG. 6 illustrates an example of application of this embodiment.

When an icon is selected by the icon selection button 5 and the modification method is selected in the embodiment shown in FIG. 3 through 5, the captured image of the user is modified and displayed in the main display area AM at a prescribed modification ratio that has been decided for every modification method specified.

In this example of application, however, the step-by-step process of the modification by the modification processing specified by the user is displayed in the main display area AM in the manner shown in FIG. 6. The user is capable of observing the process through which the image is gradually modified. If the user presses the freeze button 7 when the image is gradually being modified, the modified image is frozen in the state of modification prevailing at the time. The modified image prevailing when the freeze button 7 was pressed will be printed by pressing the decide/print button 6.

It will suffice to gradually increase the number of interpolated pixels in the horizontal direction if the process through which the image is gradually modified is for displaying a broadened modified image, to gradually increase the number of downsampled pixels in the horizontal direction if the process through which the image is gradually modified is for displaying a more slender modified image, and to gradually increase the portions of the image subjected to a mirror-image reversal if the process through which the image is gradually modified is for displaying a mirror image.

It is possible to obtain not only an image modified at a certain prescribed modification ratio but also images modified at any desired modification ratios up to a certain prescribed modification ratio.

Figure 7:
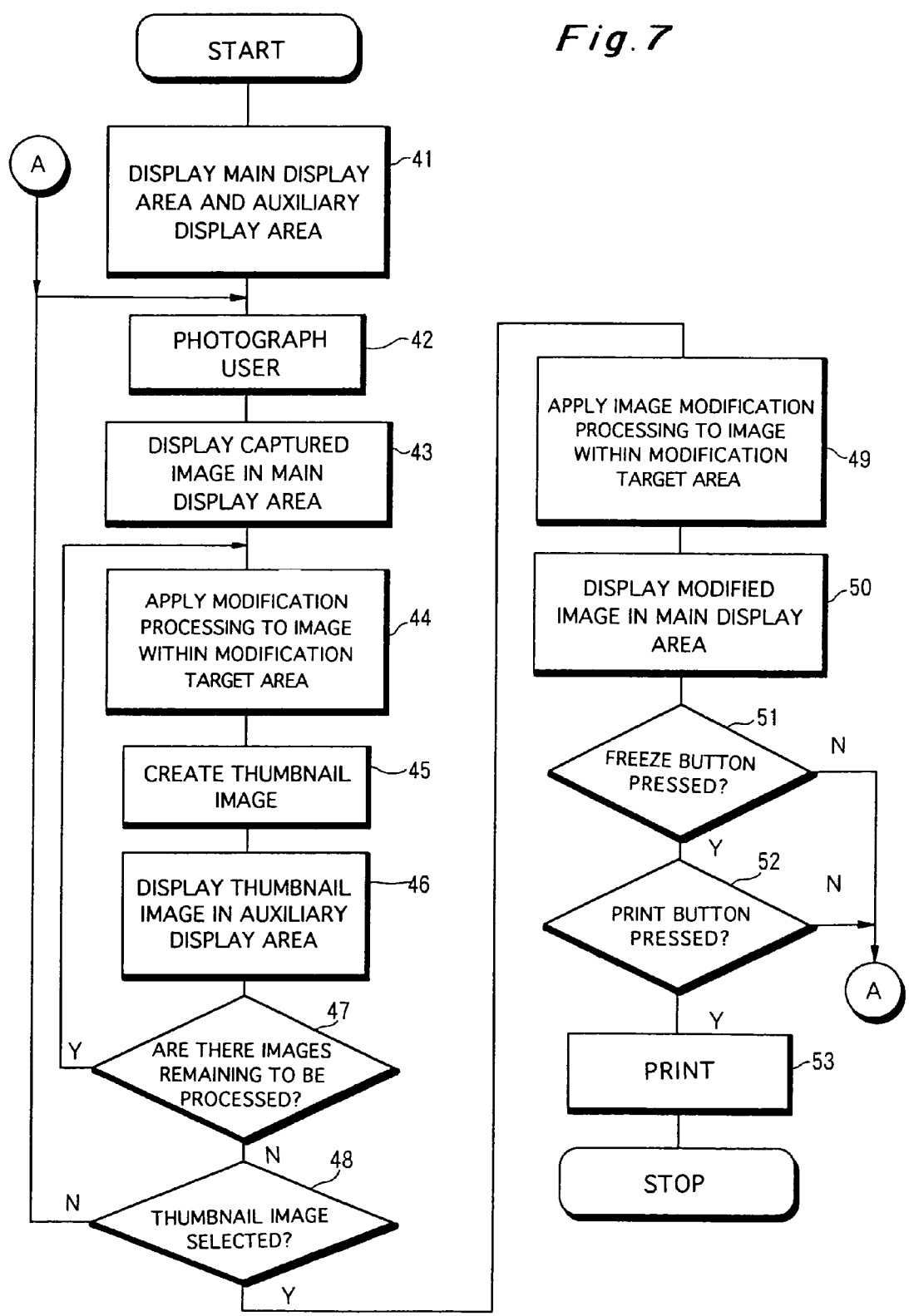
FIG. 7 is a flowchart illustrating an image modification processing procedure according to a second embodiment of the present invention.
Figure 8:
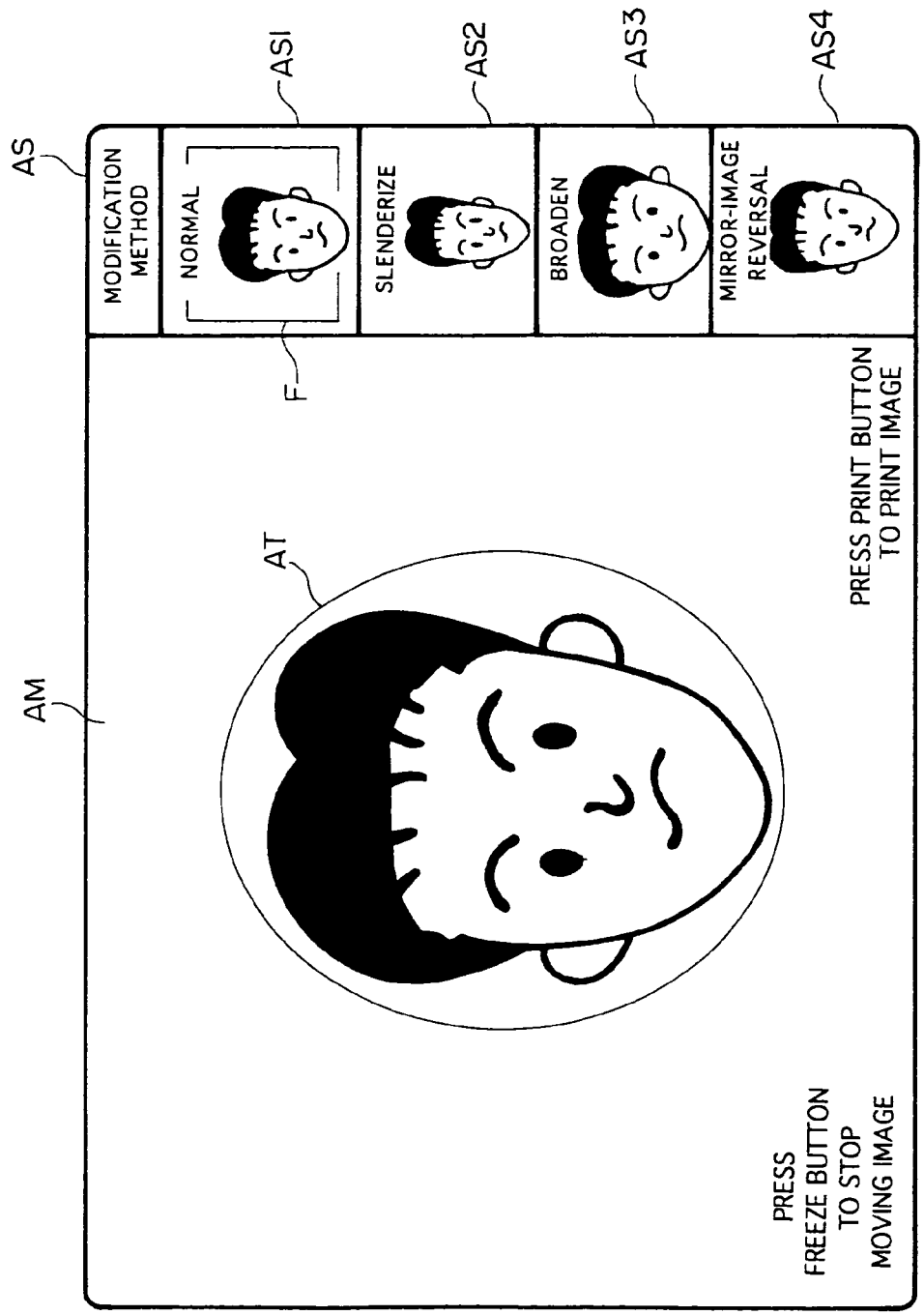
FIG. 8 is a diagram illustrating an example of a display screen according to the second embodiment of the present invention.

FIGS. 7 and 8 illustrate another embodiment of the present invention, in which FIG. 7 is a flowchart illustrating the procedure of processing executed by the image modification apparatus 1 and FIG. 8 illustrates an example of a display screen presented on the monitor display unit 3 of the image modification apparatus 1.

In the embodiment illustrated in FIGS. 3 through 5, icons for specifying modification methods are displayed in the auxiliary display area AS. According to the embodiment shown in FIGS. 7 and 8, however, thumbnail images of the image of the user obtained by photography are displayed. Four auxiliary display areas are formed in the auxiliary display area AS in a manner the same as that of the screen shown in FIG. 4. A thumbnail image of the user that has not been modified, a modified slender thumbnail image of the user, a modified broad thumbnail image of the user and a modified mirror-image thumbnail image of the user are displayed in the four auxiliary display areas AS1, AS2, AS3 and AS4, respectively.

When coins are inserted into the coin insertion slot 9, the image that includes the main display area AM and auxiliary display area AS is displayed on the display screen of the monitor display unit 3 (step 41). The user standing in front of the image modification apparatus 1 is photographed by the video camera 2 and the image of the user is displayed in the main display area AM (steps 42, 43).

Next, processing for modifying the image residing in the modification target area AT (step 44), processing for reducing the size of the modified image to a thumbnail image (step 45) and processing for displaying the modified thumbnail image (the thumbnail image of the modified image) in the auxiliary display area AS (step 46) is repeated in dependence upon the set number of types of modification methods available (step 47). In the example shown in FIG. 8, processing for reducing the size of the captured image, processing for slenderizing and reducing the size of the captured image, processing for broadening and reducing the size of the captured image and processing for taking a mirror image of and reducing the size of the captured image is executed. In a case where a thumbnail image that has not been modified is displayed (the first auxiliary display area AS1 in FIG. 8), it goes without saying that the processing indicated at step 44 would be skipped.

If all modified thumbnail images capable of being modified are displayed in the auxiliary display area AS of the image modification apparatus 1, the particular auxiliary display area in which the modified thumbnail image desired to be printed by the user is being displayed is designated by the user through use of the icon selection button 5 and decided by the user through use of the decide/print button 6 (step 48). As a result, the modification method is specified by the user.

If the modification method has been decided, the image residing in the modification target area AT is subjected to modification processing by the specified modification method (step 49). The image in the modification target area AT is modified and displayed in the main display area AM (step 50).

By pressing the freeze button 7 and decide/print button 6, the user causes the printer 26 to print the modified image that prevailed when the freeze button 7 was pressed.

Since thumbnail images after modification are displayed in the auxiliary display area AS in the example shown in FIGS. 7 and 8, the user is capable of ascertaining which modified image will be obtained.

Figure 9:
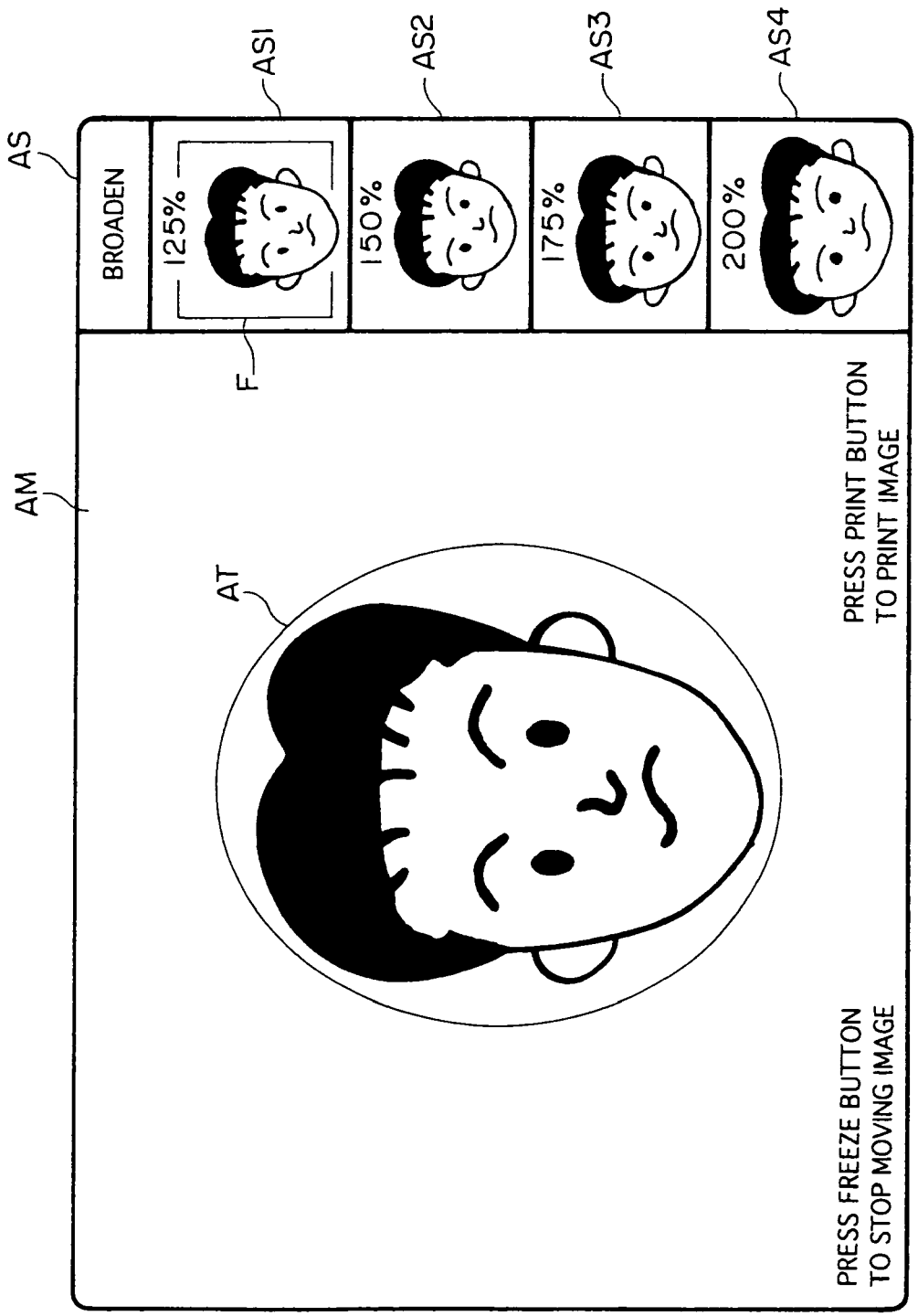
FIG. 9 is a diagram illustrating an example of a display screen according to the second embodiment of the present invention.

FIG. 9 illustrates an example of application of the embodiment shown in FIGS. 7 and 8. This illustrates an example of the display screen presented on the monitor display unit 3.

Here a plurality of modified thumbnail images that have been modified at different modification ratios are displayed in the auxiliary display area AS of the display screen. When the user selects any one of the four auxiliary display areas on the screen shown in FIG. 8, a plurality of thumbnail images having different modification ratios are displayed in the auxiliary display area AS in the manner shown in FIG. 9. The user is photographed by the video camera 2 and image data representing a thumbnail image of the image of the subject representing the user is generated by the CPU 20. Image data representing a plurality of thumbnail images modified at different modification ratios is then generated from the above-mentioned thumbnail image by the CPU 20. The image data thus generated is applied to the image display controller 23, whereby a plurality of modified thumbnail image having different modification ratios are displayed in the auxiliary display area AS. Using the icon selection button 5 and decide/print button 6, the user specifies the modified thumbnail image that has been modified at the desired modification ratio from the plurality of thumbnail images having the different modification ratios.

The modified image having the modification ratio of the thumbnail image that has been specified is displayed in the main display area AM and is printed. Pressing the cancel button 8 returns the screen to that shown in FIG. 8.

By way of example, consider a case where the third auxiliary display area AS3 is selected when the display screen of the display unit 3 is in the state shown in FIG. 8. In such case, as shown in FIG. 9, a modified thumbnail image obtained by broadening the unmodified image of the user by 125% is displayed in the first auxiliary display area AS1 of the auxiliary display area AS, a modified thumbnail image obtained by broadening the unmodified image of the user by 150% is displayed in the second auxiliary display area AS2, a modified thumbnail image obtained by broadening the unmodified image of the user by 175% is displayed in the third auxiliary display area AS3, and a modified thumbnail image obtained by broadening the unmodified image of the user by 200% is displayed in the fourth auxiliary display area AS4. Any one of the plurality of modified thumbnail images thus displayed is selected.

It is of course possible to adopt an arrangement in which, rather than displaying a plurality of thumbnail images having different modification ratios in the auxiliary display area AS, the process of modification is displayed in the main display area AM, the process of modification is stopped at a desired time and the image being displayed at this time is printed.

Figure 10:
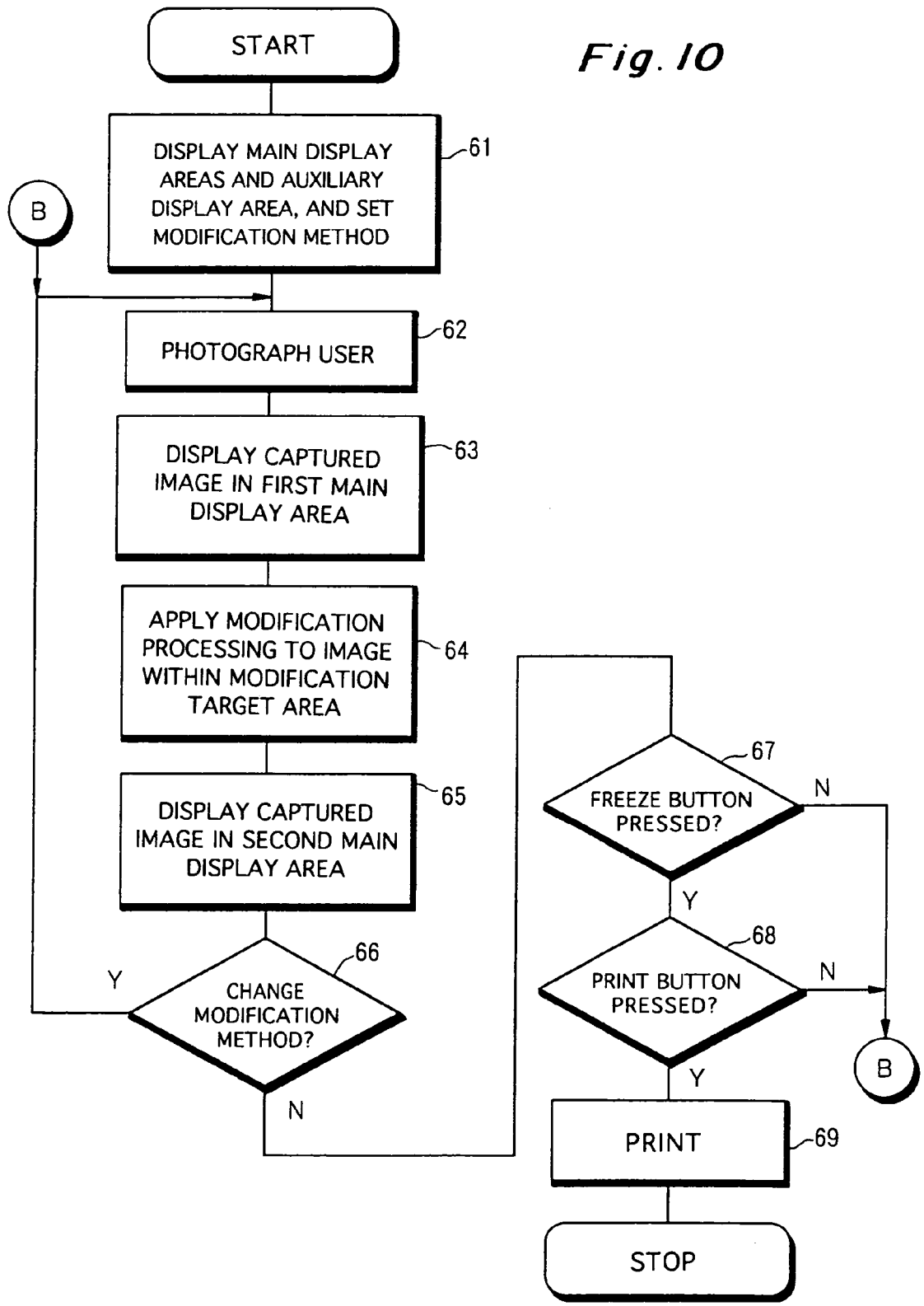
FIG. 10 is a flowchart illustrating an image modification processing procedure according to a third embodiment of the present invention.

FIGS. 10 and 11 illustrate yet another embodiment of the present invention, in which FIG. 10 is a flowchart illustrating the procedure of processing executed by the image modification apparatus 1 and FIG. 11 illustrates an example of a display screen presented on the monitor display unit 3 of the image modification apparatus 1.

In the embodiment illustrated in FIGS. 3 through 5, the main display area AM appears on substantially the entire screen of the monitor display unit 3. By contrast, in the embodiment illustrated in FIGS. 10 and 11, a first main display area AM1 and a second main display area AM2 are formed in respective approximate halves of the screen of the monitor display unit 3. The first main display area AM1 is an area for displaying an image that represents the user before modification processing, and the second main display area AM2 is an area for displaying an image that represents the user after modification processing. The modification target area AT is displayed in the first main display area AM1.

When coins are inserted into the coin insertion slot 9, the first main display area AM1, the second main display area AM2 and the auxiliary display area AS are displayed on the display screen of the monitor display unit 3 (step 61). Further, the modification method of a modified image displayed in the second main display area AM2 is preset before the user specifies the modification method.

The user moves in such a manner that his or her face will fall within the modification target area AT. The user is photographed by the video camera 2 (step 62) and the user image, which has not been modified, is displayed in the first main display area AM1 (step 63). The image residing in the modification target area AT is modified by the modification method preset at step 61 (step 64). The modified image is displayed in the second main display area AM2 (step 65).

If the user wishes to obtain a modified image different from the image whose modification was preset at step 61, then, using the icon selection button 5 and decide/print button 6, the user specifies the icon representing the desired modification method from the icons being displayed in the auxiliary display area AS ("YES" at step 66). The image resulting from the modification processing specified by the icon decided by the user is displayed in the second main display area AM2 (steps 62 through 65).

If the modification method that furnished the image being displayed in the second main display area AM2 is satisfactory, then the user presses the freeze button 7 and decide/print button 6 (steps 67 and 68) so that the image being displayed in the second main display area AM2 is printed (step 69).

FIGS. 12a through 16 illustrate still another embodiment of the present invention. FIGS. 12a through 12d depict modification target areas displayed on the display screen of the monitor display unit 3, and FIGS. 13 through 16 illustrate examples of display screens presented on the monitor display unit 3.

Figure 12A:
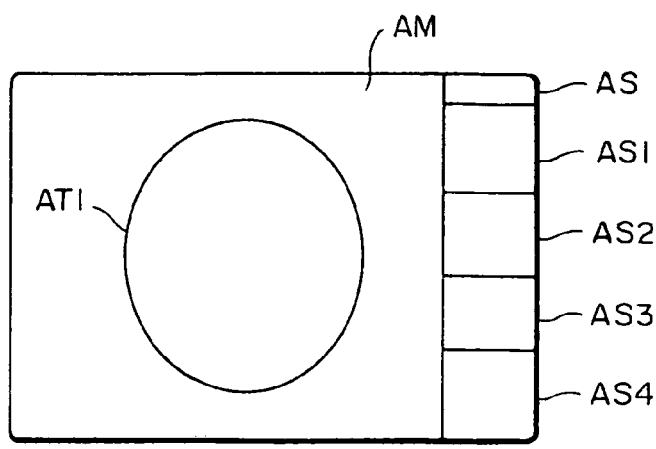
FIGS. 12a through 12d illustrate modification target areas according to a fourth embodiment of the present invention.
Figure 12B:
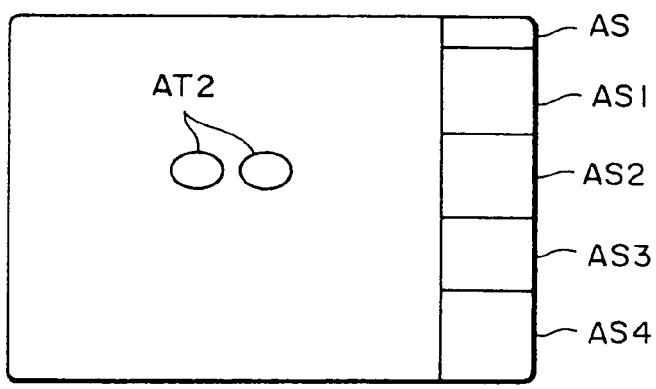
Figure 12C:
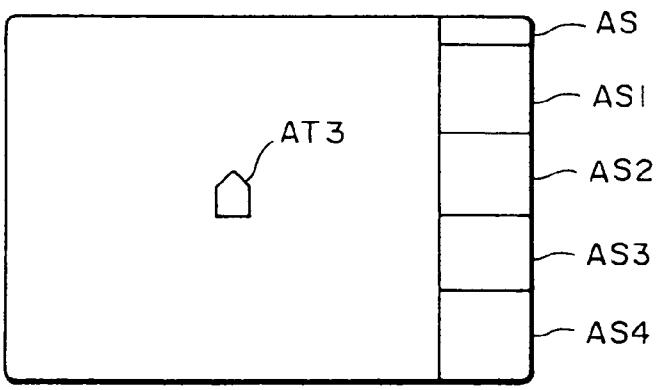
Figure 12D:
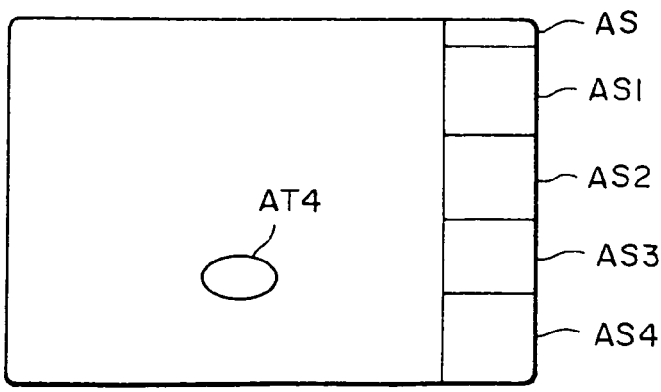

According to this embodiment, a plurality of modification target areas are established. A modification target area AT1 shown in FIG. 12a is set so as to modify the entire face of the image representing the user. Modification target areas AT2 shown in FIG. 12b are set so as to modify portions of the image corresponding to the eyes on the face of the user. A modification target area AT3 shown in FIG. 12c is set so as to modify a portion of the image corresponding to the nose on the face of the user. A modification target area AT4 shown in FIG. 12d is set so as to modify a portion of the image corresponding to the mouth on the face of the user. Modification area data representing these modification target areas AT1~AT4 is stored in the memory 25.

In this embodiment, a plurality of modification target areas are set and it is possible to modify all of the images residing within these plurality of modification target areas or an image residing in any one of these plurality of modification target areas. As will be illustrated later in greater detail, the plurality of modification target areas are displayed in the auxiliary display area AS and the modification method is specified after a modification target area is specified. If necessary, modification by a desired modification method can be performed in a modification area desired by the user by repeating the specification of modification target area and modification method.

When coins are inserted into the coin insertion slot 9 of the image modification apparatus 1, main display area AM and auxiliary display area AS are displayed on the display screen of the monitor display unit 3. The user is photographed by the video camera 2 and the image representing the user is displayed in the main display area AM in the manner shown in FIG. 13. The first, second, third and fourth auxiliary display area AS1, AS2, AS3 and AS4 are displayed in the auxiliary display area AS. An icon representing the face is displayed in the first auxiliary display area AS1, icons representing the eyes are displayed in the second auxiliary display area AS2, an icon representing the nose is displayed in the third auxiliary display area AS3, and an icon representing the mouth is displayed in the fourth auxiliary display area AS4. The screen in which the plurality of modification target areas are displayed in the auxiliary display area AS in the manner shown in FIG. 13 is referred to as the "initial screen".

The icon displayed in the first auxiliary display area AS1 on the initial screen is selected by the user when the modification target area AT1 that modifies the full face is to be displayed in the main display area AM, as shown in FIG. 12a, and the image residing in the modification target area AT1 is to be modified. The icon displayed in the second auxiliary display area AS2 on the initial screen is selected by the user when the modification target areas AT2 that modify the eyes are to be displayed in the main display area AM, as shown in FIG. 12b, and the images residing in the modification target areas AT2 are to be modified. The icon displayed in the third auxiliary display area AS3 on the initial screen is selected by the user when the modification target area AT3 that modifies the nose is to be displayed in the main display area AM, as shown in FIG. 12c, and the image residing in the modification target area AT3 is to be modified. The icon displayed in the fourth auxiliary display area AS4 on the initial screen is selected by the user when the modification target area AT4 that modifies the mouth is to be displayed in the main display area AM, as shown in FIG. 12d, and the image residing in the modification target area AT4 is to be modified.

Figure 13:
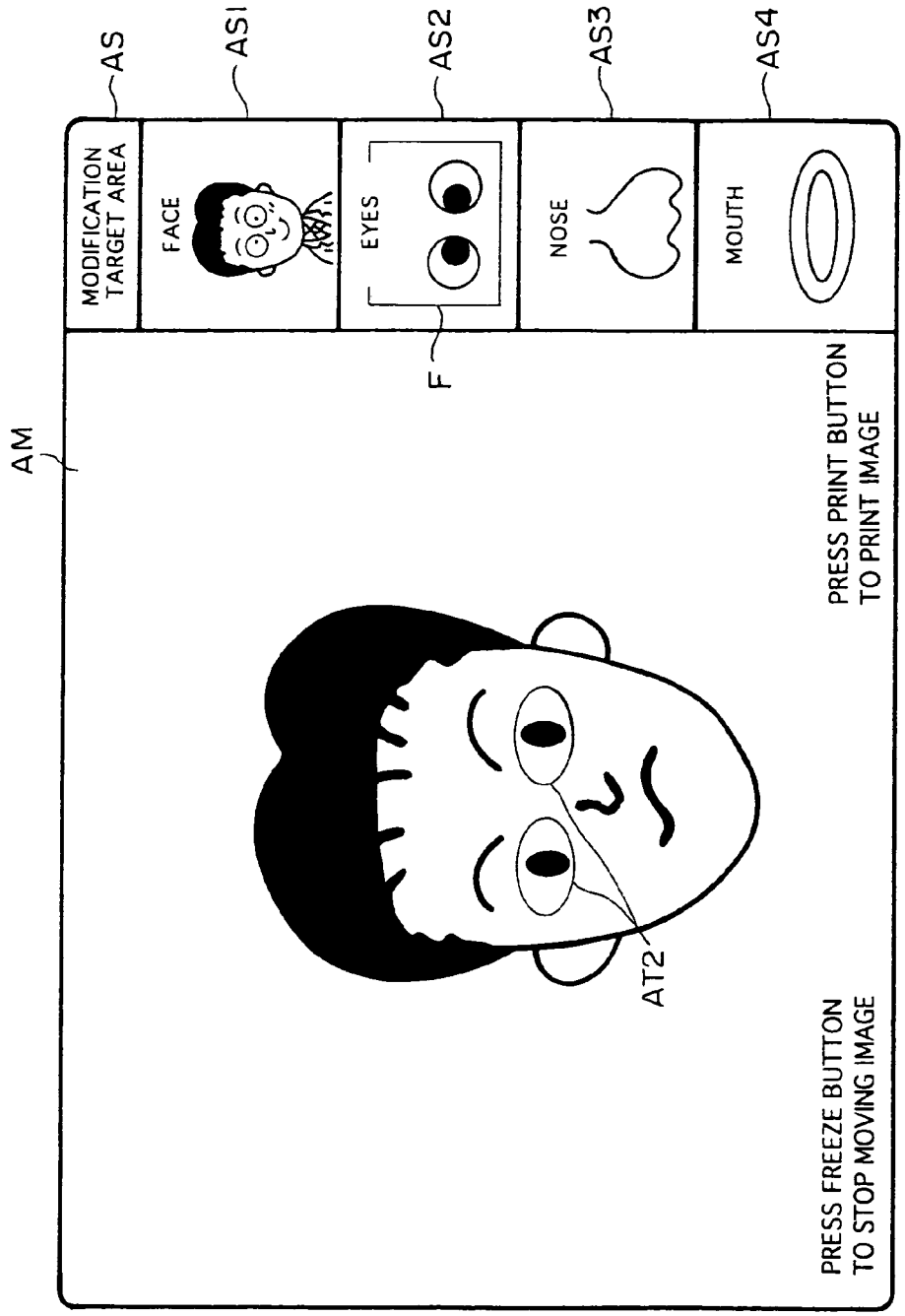
FIG. 13 is a diagram illustrating an example of a display screen according to the fourth embodiment of the present invention.

Any one of the icons among the icons displayed in the auxiliary display areas from AS1 to AS4 on the initial screen in the manner shown in FIG. 13 is specified by the user through use of the icon selection button 5 and decide/print button 6. When the icon has been specified, the modification target area represented by the specified icon is displayed in the main display area AM and a plurality of icons representing methods of modification that may be applied to the modification target area represented by the specified icon are displayed in the auxiliary display area AS.

Figure 14:
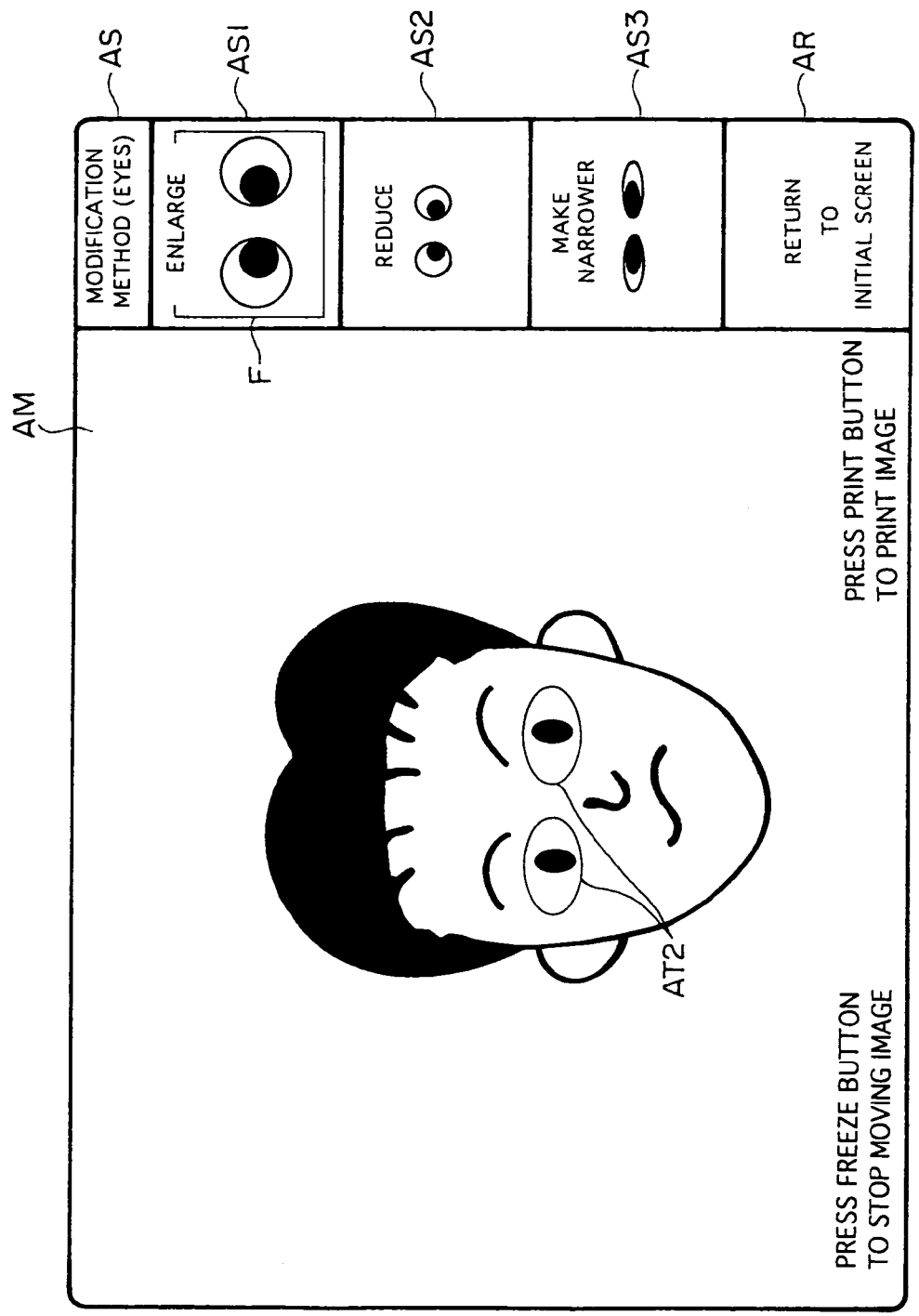
FIG. 14 is a diagram illustrating an example of a display screen according to the fourth embodiment of the present invention.
Figure 15:
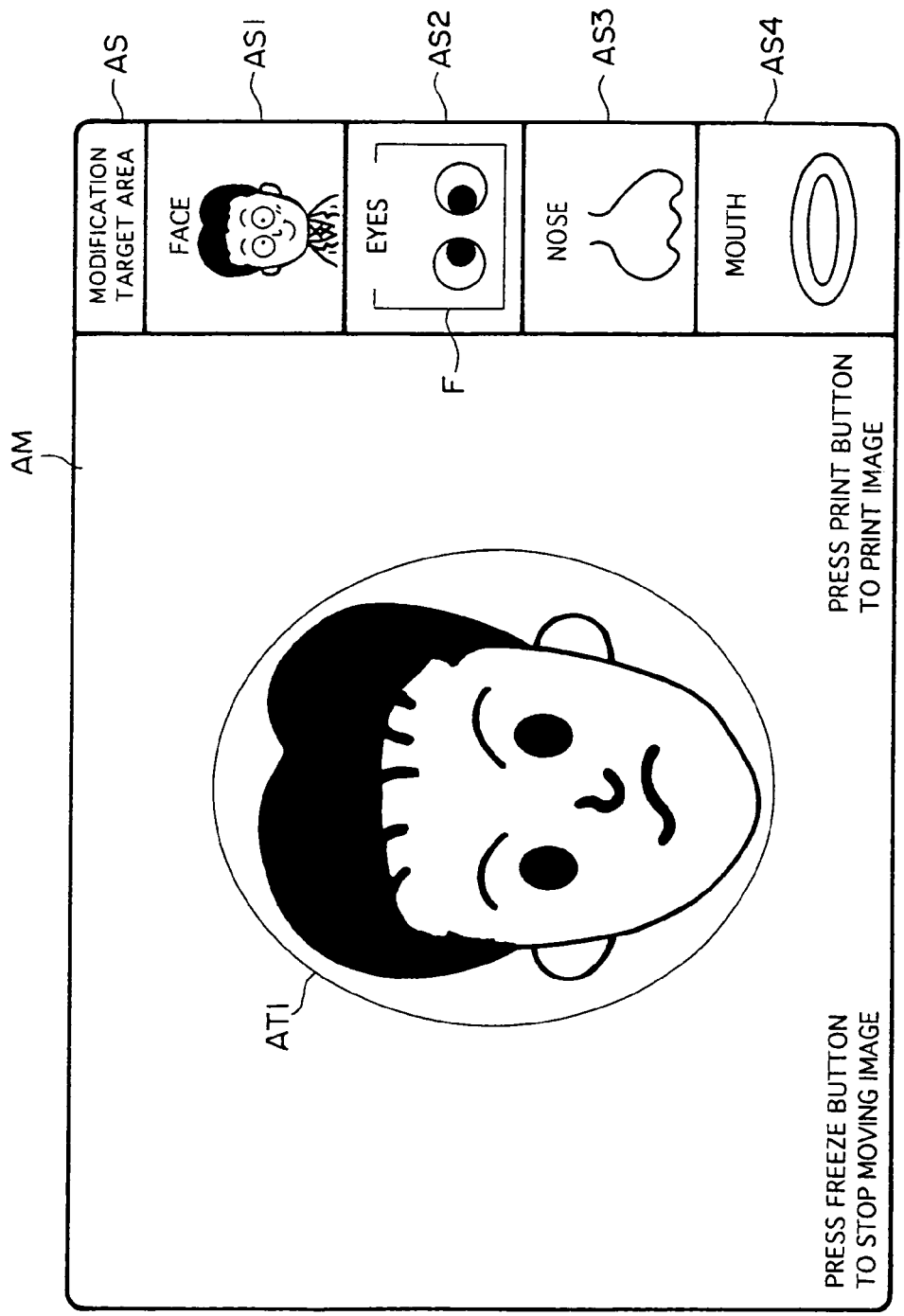
FIG. 15 is a diagram illustrating an example of a display screen according to the fourth embodiment of the present invention.

For instance, the example shown in FIG. 14 illustrates a case in which the icon displayed in the second auxiliary display area AS2 has been specified on the initial screen. In this case, the modification target areas AT2 for modifying the eyes are displayed in the main display area AM. The first through fourth auxiliary display area AS1 through AR are displayed in the auxiliary display area AS. An icon specified in a case where the eyes are to be enlarged is displayed in the first auxiliary display area AS1, an icon specified in a case where the eyes are to be reduced in size is displayed in the second auxiliary display area AS2, and an icon specified in a case where the eyes are to be narrowed is displayed in the third auxiliary display area AS3. Characters indicating restoration of the initial screen are displayed in the fourth auxiliary display area AR.

If the image being displayed in the main display area AM is to be printed, the freeze button 7 and decide/print button 6 are pressed by the user. This causes the image displayed in the main display area AM to be printed.

In a case where further modification processing is to be executed, the characters being displayed in the fourth auxiliary display area AR are specified by the user through use of the icon selection button 5 and decide/print button 6. When this is done, the display screen of the monitor display unit 3 changes to the initial display screen, which now displays in its main display area AM the image that was subjected to modification within the modification target area.

Figure 16:
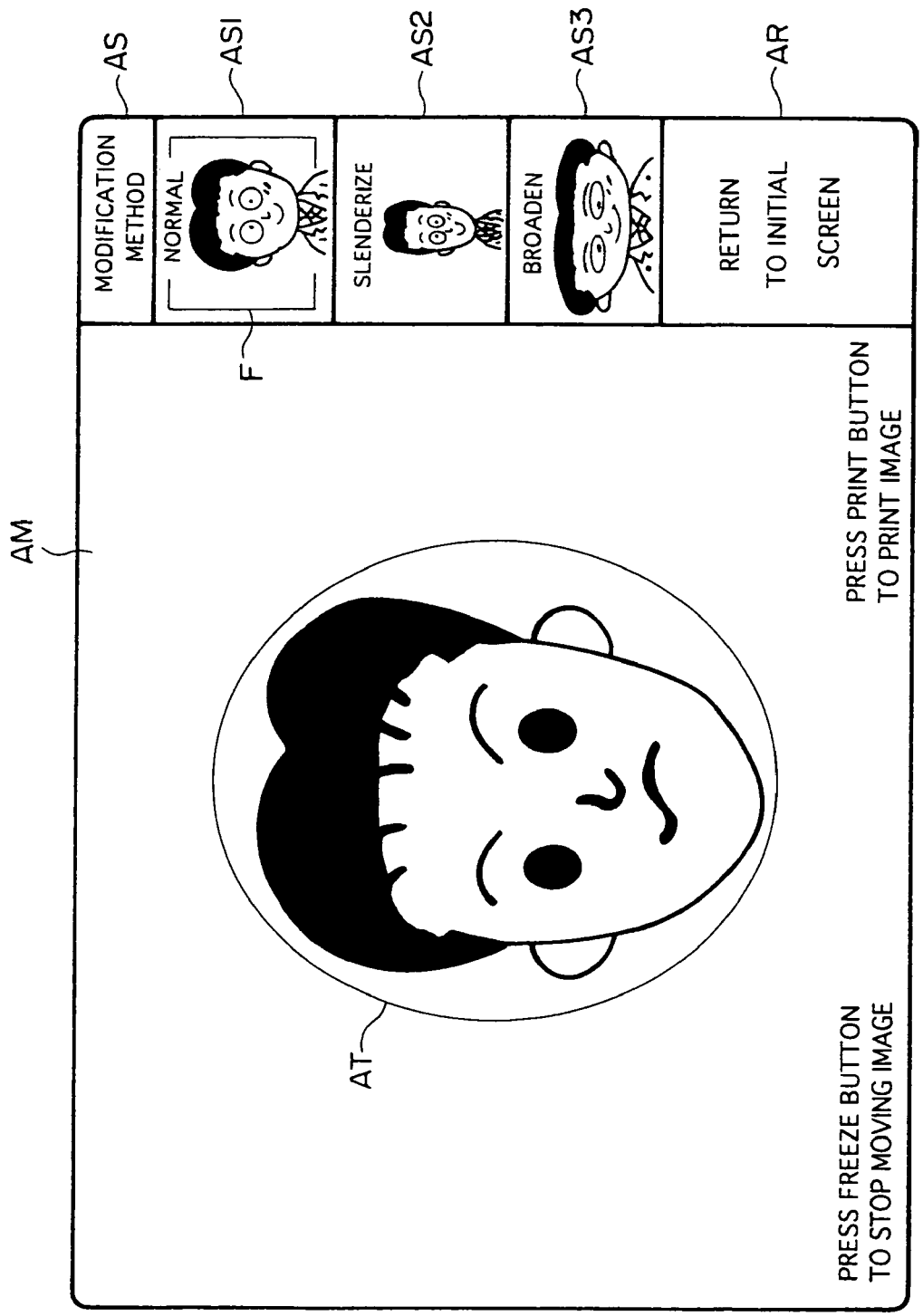
FIG. 16 is a diagram illustrating an example of a display screen according to the fourth embodiment of the present invention.

One of the icons among the plurality thereof displayed in the auxiliary display area AS is specified by the user (FIG. 15) and the modification target area represented by the specified icon is displayed in the main display area AM. Further, icons representing methods of modification that may be applied to the modification target area represented by the specified icon are displayed in the auxiliary display area AS (FIG. 16). By selecting an icon being displayed in the auxiliary display area AS, the user specifies the modification method so that the image within the modification target area is modified by the modification method that has been decided.

In a case where modification processing is to be repeated, the icon being displayed in the fourth auxiliary display area AR is specified again. As a result, the display screen of the monitor display unit 3 is restored to the initial screen. In a case where modification processing is finished and an image is to be printed, the user presses the freeze button 7 and decide/print button 6, whereby the image is printed by the printer 26. The print is dispensed from the print dispenser 11.

The image modification processing applied to the images in the modification target areas AT2, AT3 and AT4 can be implemented by detecting the eyes, nose and mouth of the user utilizing edge detection, interpolating pixels and downsampling pixels, etc. Further, the modification processing applied to the images in the modification target areas AT2, AT3 and AT4 can be implemented by enlargement, reduction and mirror-image processing, etc., using the centers of the modification target areas AT2, AT3 and AT4 as the reference, without detecting such areas as the eyes, nose and mouth.

Though a modification target area is displayed on the display screen in the above-described embodiment, a modification target area need not necessarily be displayed on the display screen. It goes without saying that even if a modification target area is not displayed, image modification processing may be executed in a manner similar to that when a modification target area is displayed.

Yet another embodiment is illustrated in the diagrams from FIGS. 17 to FIGS. 23a, 23b.

Figure 17:
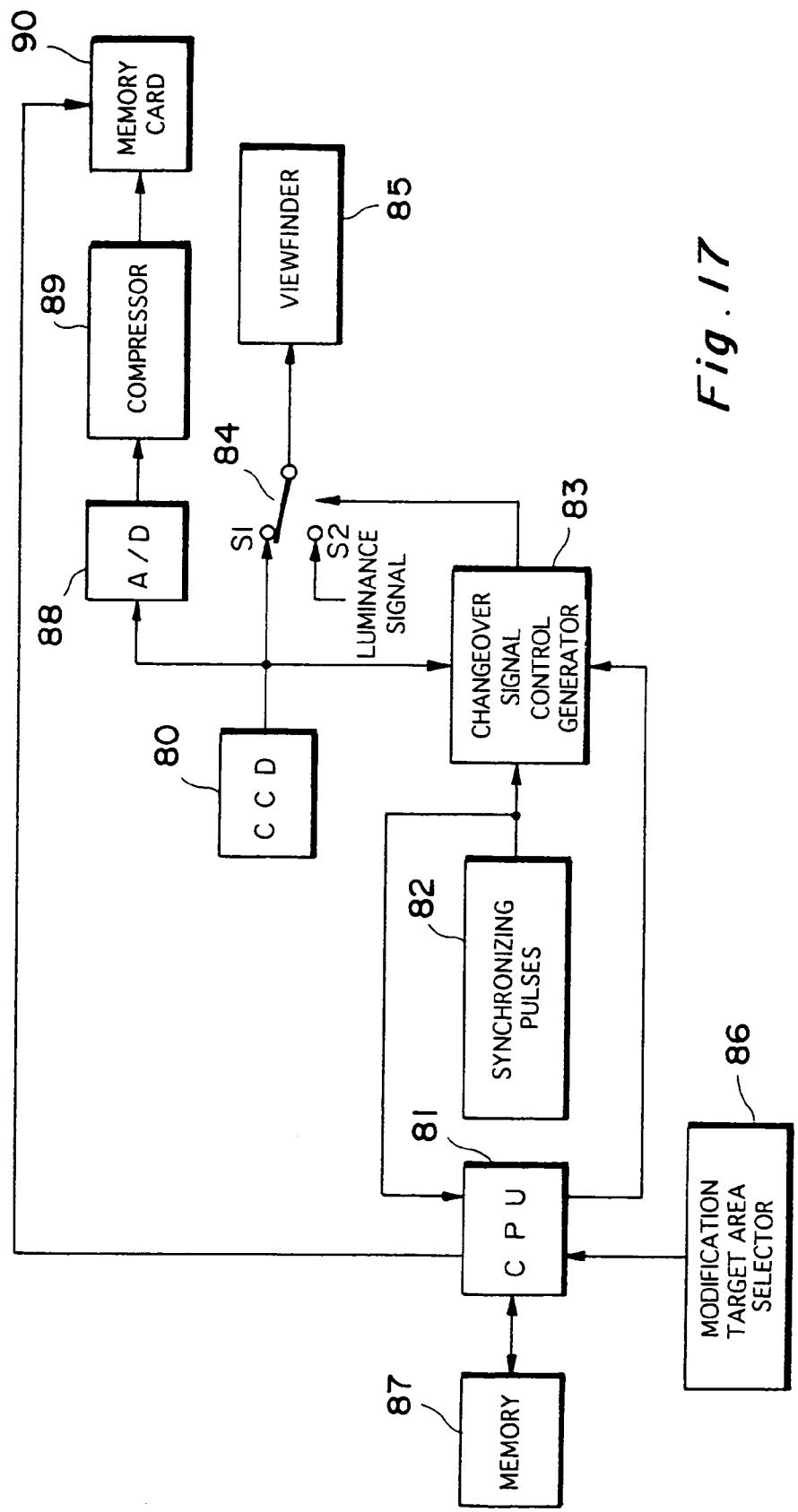
FIG. 17 is a block diagram illustrating the electrical construction of a digital still camera according to a fifth embodiment of the present invention.

FIG. 17 is a block diagram illustrating the electrical construction of a digital still camera, and FIG. 18 illustrates an image modification processing file included in the memory of the digital still camera.

The image modification apparatus 1 captures the image of a subject and subjects the image of the subject to modification processing. The digital still camera shown in FIG. 17 captures the image of the subject but the image modification processing is executed by another image modification apparatus that utilizes a personal computer or the like.

The overall operation of the digital still camera is under the control of a CPU 81. A memory 87 is connected to the CPU 81 and stores the image modification processing illustrated in FIG. 18.

The image modification processing file includes an image modification processing header, an image modification method data and modification target area data.

The image modification processing header indicates that the file is an image modification processing file.

The image modification method data is data representing the processing method (enlargement, reduction, rotation, etc.) that modifies the image within the modification target area. The data is part of a prescribed image modification processing program. When it is possible to execute a plurality of modification processing operations within the same modification target area, image modification processing data commensurate with these plurality of processing operations is stored.

The modification target area data is data representing a modification target area displayed in a viewfinder (comprising a liquid crystal device in this embodiment) 85. The modification target area data is binary data, by way of example. In addition, the data may be compressed by zero run-length or other data compression processing. If the data has been compressed, then the compressed modification target area data is decompressed by the CPU 81.

A synchronizing clock pulse generating circuit 82 generates synchronizing clock pulses, which are applied to the CPU 81 and to a changeover control signal generating circuit 83.

A desired modification target area is selected by a modification target area selection switch 86. The modification target area selection switch 86 produces a selection signal that enters the CPU 81. In conformity with the entered selection signal, the CPU 81 reads modification target area data from the image modification processing file that has been stored in the memory 87. This modification target area data is applied to the changeover control signal generating circuit 83.

A video signal representing the image of the subject output by a CCD 80 is applied to an S1 terminal of a changeover switch 84 and to the changeover control signal generating circuit 83. A luminance signal representing luminance of a fixed level is applied to a S2 terminal of the changeover switch 84. The level of the luminance signal is the level of the modification target area. A signal representing a modification target area and synchronized to the video signal output by the CCD 80 is produced by the changeover control signal generating circuit 83 as a changeover control signal.

The changeover control signal is applied to the changeover switch 84. The changeover switch 84 is connected to the S2 terminal when the changeover control signal output by the changeover control signal generating circuit 83 is being applied to the switch, and is connected to the S1 terminal when the changeover control signal is not be applied. The signal that passes through the changeover switch 84 is applied to the viewfinder 85. The image of the subject along with the representation of the modification target area is displayed in the viewfinder 85. The photographer moves the camera in such a manner that the part of the subject that the user wishes to modify falls within the modification target area. Naturally, rather than moving the camera, a person may have the subject move if the subject is the person himself or herself.

The video signal output by the CCD 80 is converted to digital image data by an analog/digital (A/D) converting circuit 88. The image data is compressed by a data compressing circuit 89 and the compressed data is stored on a memory card 90. [The compression applied is in accordance with the JPEG (Joint Photographic Experts Group).] Data representing the modification target area selected by the modification target area selection switch 86 and image modification method data corresponding to the modification target area data that has been selected also is applied to the memory card 90 and recorded on the memory card 90 in association with the image data that has been obtained by photography.

Figure 19:
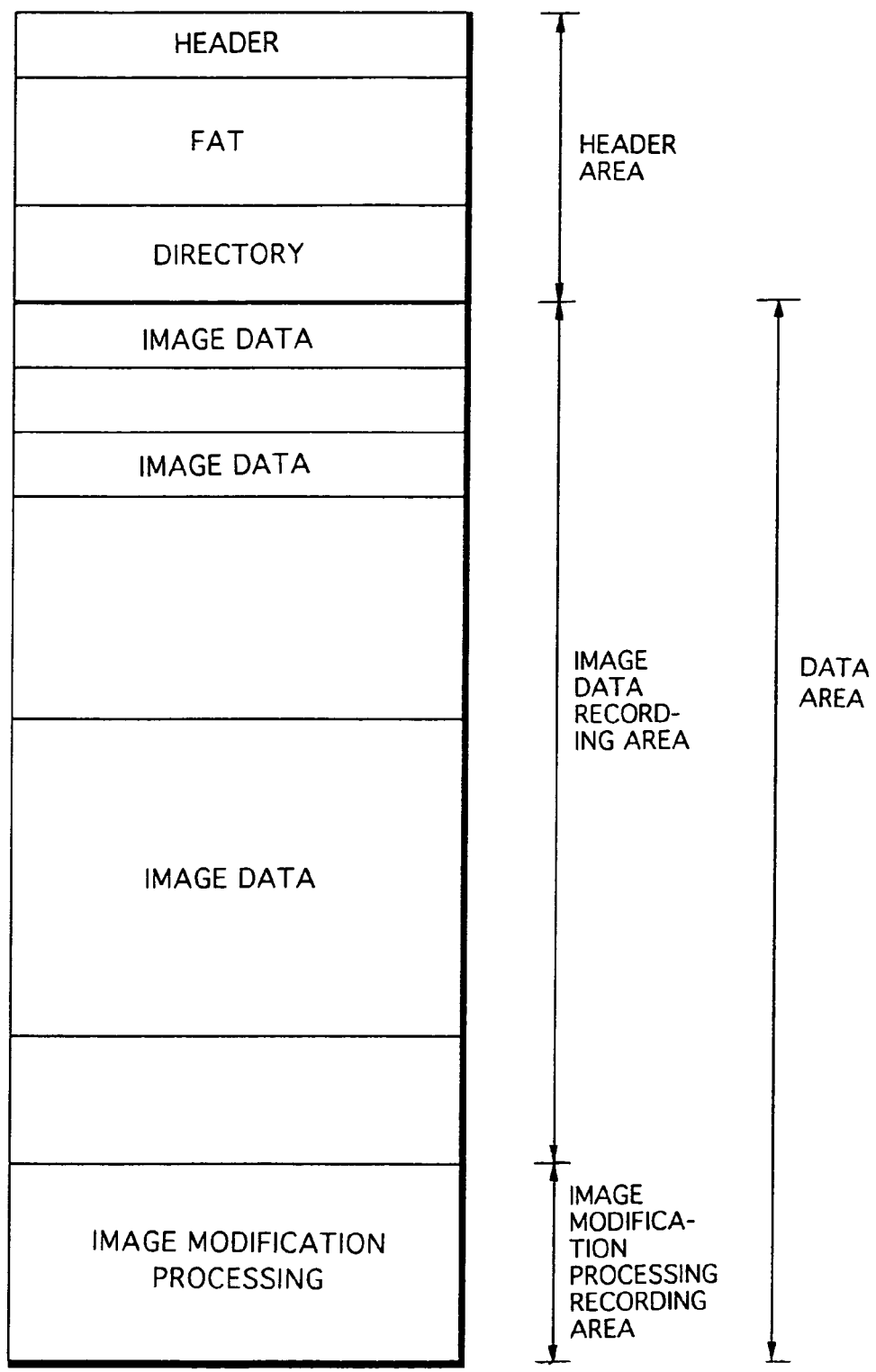
FIG. 19 illustrates the file structure of a memory card according to the fifth embodiment of the present invention.

FIG. 19 illustrates the file structure of the memory card 90.

The memory card 90 includes a header area and a data area. The header area includes a header, a FAT (file allocation table) and a directory. The data area includes an image data recording area and an image modification processing recording area. Image data obtained by photography is recorded in the image data recording area. Image modification method data and modification target area data is recorded in the image modification processing recording area. The association between the image data and the image modification method data and modification target area corresponding to this image data is managed by the FAT.

The memory card 90 on which the image data, image modification processing data and modification target area data has thus been recorded is inserted into an image modification apparatus in which an image modification processing program has been stored, whereby processing similar to the above-described image modification processing is executed.

Figure 20:
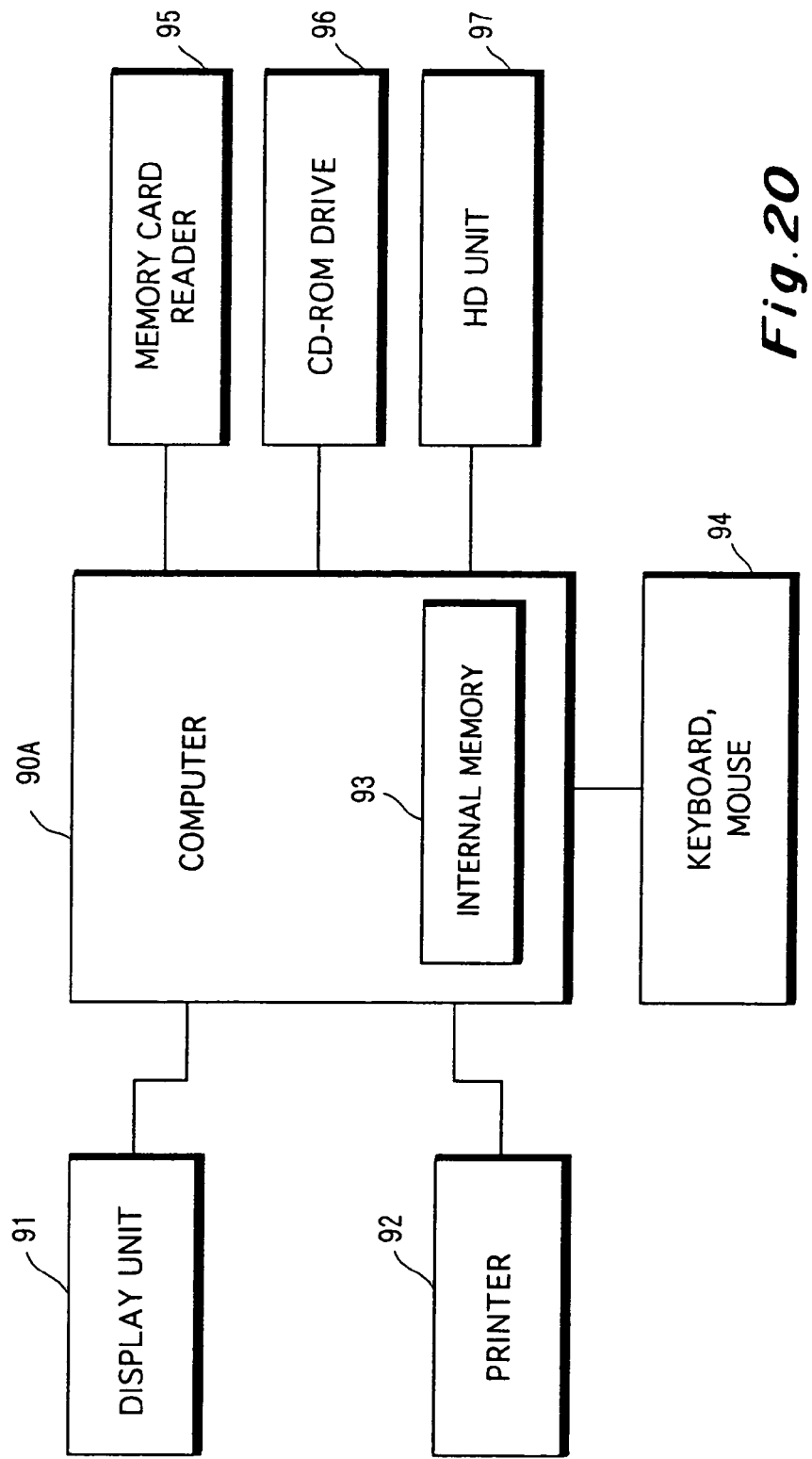
FIG. 20 is a block diagram illustrating the electrical construction of an image modification apparatus according to the fifth embodiment of the present invention.

FIG. 20 is a block diagram illustrating the electrical construction of an image modification apparatus.

The image modification apparatus includes a computer 90A. The computer 90A includes an internal memory 93 in which the above-described image modification processing program has been stored.

A display unit 91 and an input unit (a mouse, keyboard, etc.) 94 are connected to the computer 90A. A memory card reader 95, CD-ROM (compact disc-read-only memory) drive 96 and an HD (hard disk) unit 97 are connected to the computer 90A. The memory card reader 95 reads data out of the memory card, the CD-ROM drive 96 read data out of the CD-ROM and the HD unit 97 writes data to and reads data from a hard disk. A printer 92 is connected to the computer 90A.

When the memory card 90 on which the image data, image modification processing data and modification target area data has thus been recorded is inserted into the memory card reader 95, the image data as well as the image modification method data and modification target area data corresponding to this image data recorded on the memory card 90 is read and applied to a computer 90A by the memory card reader 95.

On the basis of the image modification program that has been stored in the internal memory 93, image modification processing specified by the image modification method data is applied to that part of an image, which is represented by image data that has been recorded on the memory card 90, that lies within the modification target area represented by the modification target area data. The image obtained by this image modification processing is displayed on the display unit 91. The image is printed by the printer 92 if necessary.

Figure 21:
FIG. 21 illustrates the image of a subject according to the fifth embodiment of the present invention.
Figure 22A:
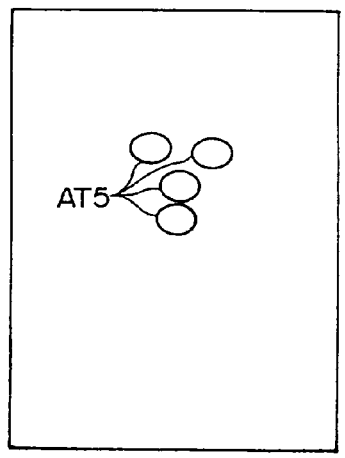
FIG. 22a illustrates modification target areas and FIG. 22b the image of the subject after modification according to the fifth embodiment of the present invention.
Figure 22B:
Figure 23A:
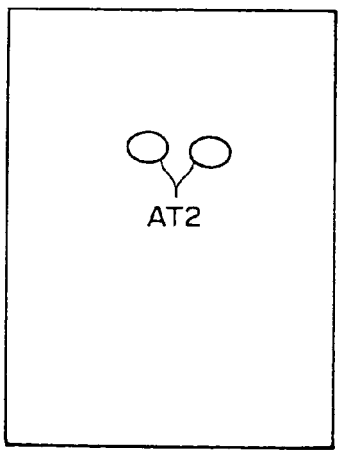
FIG. 23a illustrates modification target areas and FIG. 23b the image of the subject after modification according to the fifth embodiment of the present invention.
Figure 23B:

FIG. 21 illustrates the image of a subject that has not been subjected to modification processing. FIGS. 22*a* and 23*a* illustrate modification target areas. FIG. 22*b* illustrates the image of the subject obtained by modifying images residing in the modification target areas AT5 shown in FIG. 22*a*, and FIG. 23*b* illustrates the image of the subject obtained by modifying images residing in the modification target areas AT2 shown in FIG. 23*a*.

The subject is photographed and the image of the subject shown in FIG. 21 is obtained. The image of the subject is displayed in the viewfinder 85 of the digital still camera described above.

If the modification target areas AT5 shown in FIG. 22*a* have been selected by the selection switch 86, the modification target areas AT5 are displayed on the display screen of the viewfinder 85 in a form superimposed on the image of the subject. If the modification target areas AT5 shown in FIG. 22*a* have been selected, the images residing within these modification target areas AT5 are subjected to processing that causes these images to widen in the horizontal direction. The image of the subject after modification is shown in FIG. 22*b*.

If the modification target areas AT2 shown in FIG. 23*a* have been selected, the modification target areas AT2 are displayed on the display screen of the monitor display unit 3. If the modification target areas AT2 shown in FIG. 23*a* have been selected, the images residing within these modification target areas AT2 are subjected to processing that pulls the images upwardly to the right. The image of the subject after modification is shown in FIG. 23b.

Figure 24:
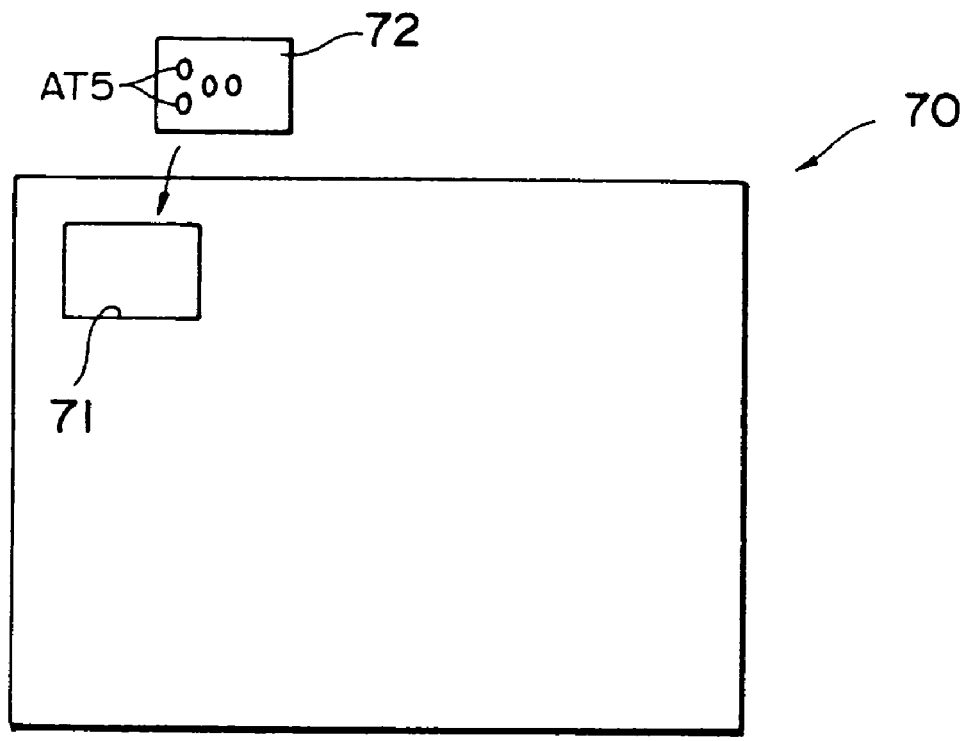
FIG. 24 is a back view of a digital still camera.

FIG. 24 is a back view of a digital still camera 70.

The digital still camera 70 has a window serving as a viewfinder 71 instead of the liquid-crystal viewfinder 85 described above. In the case of this digital still camera formed to have the viewfinder 71, use is made of a transparent sheet 72 on which are printed modification target areas AT5 that conform to the image modification processing executed by the camera. In a case where image modification processing is executed by the digital still camera, the transparent sheet 72 is affixed to the surface of the viewfinder 71. The photograph takes a picture of the subject in such a manner that the desired portions of the subject to be modified will fall within the modification target areas AT5 seen through the viewfinder 71 having the affixed transparent sheet 72.

Using the switch 86, the photographer selects the modification target areas corresponding to the transparent sheet affixed to the viewfinder 71. Image modification method data and modification target area data corresponding to the selected modification target areas is read out of the memory 87 and recorded on the memory card 90 in a form associated with the image data. The memory card 90 is subsequently inserted into the memory card reader 95 of the image modification apparatus shown in FIG. 20 and image modification processing is executed. This operation is the same as that in the case where a subject is photographed by the digital still camera whose viewfinder 85 comprises the image crystal display device.

With the digital still camera described above, an image modification processing file is stored in the memory 87 incorporated within the camera. However, it is not necessarily required that an image modification processing file be stored in the camera.

For example, the transparent sheet 72 representing a modification target area is affixed to the viewfinder 71 and data which identifies the modification target area corresponding to the affixed transparent sheet is entered from the switch 86. The modification target area identification data entered from the switch 86 is recorded on the memory card 90 in a form associated with the image data.

Image modification method data and modification target area data set by the modification target area identification data is recorded in the image modification apparatus.

The memory card 90 on which the modification target area identification data and image data has been recorded is inserted into the memory card reader 95 of the image modification apparatus, and the modification target area identification data and image data is read out. The image modification method data and modification target area data is read from the modification target area identification data that has been read out, and that part of the image of the subject, which is represented by the image data, that lies within the modification target area represented by the modification target area data is modified by the modification method represented by the image modification method data.

As many apparently widely different embodiments of the present invention can be made without departing from the spirit and scope thereof, it is to be understood that the invention is not limited to the specific embodiments thereof except as defined in the appended claims.

What is claimed is:

1. An image modification apparatus, comprising:
a reading device for reading digital image data representing the image of a subject, and digital modification target area data specifying a modification target area of the subject, from a storage medium accessed by said reading device, the storage medium having an image data recording area, an image modification processing recording area and a header area containing a file allocation table and a directory; and
an image modification device for processing the digital image data so as to modify the appearance of an image that lies within the modification target area specified by the modification target area data stored in the storage medium.

2. The image modification apparatus according to claim 1, wherein the storage medium is a memory card.

3. The image modification apparatus according to claim 1, wherein the image modification device slenderizes the image of the subject that lies within the modification target area.

4. The image modification apparatus according to claim 1, wherein the image modification device broadens the image of the subject that lies within the modification target area.

5. The image modification apparatus according to claim 1, wherein the image modification device mirrors the image of the subject that lies within the modification target area.

6. The image modification apparatus according to claim 1, wherein the modification target area of the subject is an eye of the subject.

7. The image modification apparatus according to claim 1, wherein the modification target area of the subject is a nose of the subject.

8. The image modification apparatus according to claim 1, wherein the modification target area of the subject is a mouth of the subject.

9. The image modification apparatus, according to claim 1, further comprising:
a display unit for displaying the image of the subject, an area of the image of the subject corresponding to the modification target area being replaced with the modified appearance.

10. An image modification apparatus, comprising:
reading means for reading digital image data representing the image of a subject, and digital modification target area data specifying a modification target area of the subject, from a storage medium accessed by said reading device, the storage medium having an image data recording area, an image modification processing recording area and a header area containing a file allocation table and a directory; and
image modification means for processing the digital image data so as to modify the appearance of an image that lies within the modification target area specified by the modification target area data stored in the storage medium.

11. The image modification apparatus, according to claim 10, further comprising:
display means for displaying the image of the subject, an area of the image of the subject corresponding to the modification target area being replaced with the modified appearance.

12. An image modification method, comprising:
reading digital image data representing the image of a subject, and digital modification target area specifying data, specifying a modification target area of the subject, from a storage medium accessed by said reading device, the storage medium having an image data recording area, an image modification processing recording area and a header area containing a file allocation table and a directory; and
processing the digital image data so as to modify the appearance of an image that lies within the modification target area specified by the modification target area data stored in the storage medium.

13. The image modification method according to claim 12, wherein the processing step include slenderizing the image of the subject that lies within the modification target area.

14. The image modification method according to claim 12, wherein the processing step includes broadening the image of the subject that lies within the modification target area.

15. The image modification method according to claim 12, wherein the processing step includes mirroring the image of the subject that lies within the modification target area.

16. The image modification method according to claim 12, wherein the modification target area of the subject is an eye of the subject.

17. The image modification method according to claim 12, wherein the modification target area of the subject is a nose of the subject.

18. The image modification apparatus according to claim 12, wherein the modification target area of the subject is a mouth of the subject.

19. The image modification method according to claim 12, further comprising:

displaying the image of the subject, an area of the image of the subject corresponding to the modification target area being replaced with the modified appearance.

* * * * *